US011521510B2

(12) United States Patent
Olsen, Jr.

(10) Patent No.: US 11,521,510 B2
(45) Date of Patent: Dec. 6, 2022

(54) SYSTEMS AND METHODS FOR ANALYSIS AND INTERACTIVE PRESENTATION OF LEARNING METRICS

(71) Applicant: SparxTeq, Inc., Orem, UT (US)

(72) Inventor: Dan Reed Olsen, Jr., Orem, UT (US)

(73) Assignee: SparxTeq, Inc., Orem, UT (US)

( * ) Notice: Subject to any disclaimer, the term of this patent is extended or adjusted under 35 U.S.C. 154(b) by 65 days.

(21) Appl. No.: 16/871,433

(22) Filed: May 11, 2020

(65) Prior Publication Data

US 2020/0342783 A1 Oct. 29, 2020

Related U.S. Application Data

(63) Continuation of application No. 16/127,193, filed on Sep. 10, 2018, now Pat. No. 10,650,698.

(60) Provisional application No. 62/556,303, filed on Sep. 8, 2017.

(51) Int. Cl.
*G09B 19/00* (2006.01)
*G09B 5/00* (2006.01)
*G09B 7/06* (2006.01)

(52) U.S. Cl.
CPC .............. *G09B 19/00* (2013.01); *G09B 5/00* (2013.01); *G09B 7/06* (2013.01)

(58) Field of Classification Search
CPC .. G09B 5/00; G09B 7/00; G06F 3/048; G06F 16/335; G06F 16/34; G06F 16/904
See application file for complete search history.

(56) References Cited

U.S. PATENT DOCUMENTS

| 6,988,138 B1 | 1/2006 | Alcorn |
| 10,650,698 B2 | 5/2020 | Olsen |
| 2005/0100875 A1* | 5/2005 | Best ...................... G09B 17/00 434/350 |
| 2008/0138788 A1 | 6/2008 | Allen |

(Continued)

OTHER PUBLICATIONS

U.S. Appl. No. 16/127,193, Non-Final Office Action dated Aug. 20, 2019, 14 pp.

(Continued)

*Primary Examiner* — Peter R Egloff
(74) *Attorney, Agent, or Firm* — PCFB, LLC; Justin K. Flanagan

(57) ABSTRACT

Identifying material with which students are struggling can guide educators' decisions on which modifications to the instructional experience will be most impactful to the learning experience. Educators make a finite selection of the nearly infinite number of possible combinations of instructional content, delivery approaches, instructional order, test questions, approaches for accountability, rubrics, and the like. Educators and administrators with thousands of students are incapable of processing the quantities of available data unaided. In some embodiments, a system enables users to view quantized metric data from a population of, for example, students. In some embodiments, the system displays a category-filtered presentation table of a single metric data source. In some embodiments, the system may display comparison presentation category cells that allow for direct, visual comparison of metric values from two different sets of quantized metric data from two different populations and thus enable instructors to improve the educational experience.

10 Claims, 15 Drawing Sheets

(56) References Cited

U.S. PATENT DOCUMENTS

2010/0047758 A1  2/2010  McCurry
2010/0261150 A1  10/2010 Matwick
2012/0244510 A1  9/2012  Watkins
2014/0272911 A1  9/2014  York
2019/0080628 A1  3/2019  Olsen

OTHER PUBLICATIONS

U.S. Appl. No. 16/127,193, Non-Final Office Action dated Dec. 11, 2019, 21 pp.

* cited by examiner

| | | | | |
|---|---|---|---|---|
| Lab 1 – Do As I'm Doing | NS 16% | – | D 84% | – | – |
| Lab 2 – Pizza | NS 17% | – | D 2% | C 2% | B 7% | A 73% |
| Lab 3 – Hybrid Car | NS 17% | – | D 2% | C 1% | B 7% | A 71% |
| Lab 4 – Plinko | NS 19% | – | D 7% | C 2% | B 11% | A 62% |
| Lab 5 – Plinko with Functions | NS 26% | – | D 10% | C 1% | B 8% | A 54% |
| Lab 6 – Hot Plate | NS 27% | – | D 5% | C 5% | B 4% | A 63% |
| Lab 7 – Restaurants | NS 29% | – | D 7% | C 2% | B 16% | A 43% |
| Lab 8 – Car Dealership | NS 30% | – | D 5% | C 2% | B 5% | A 58% |
| Lab 9 – Rock Paper Scissors | NS 97% | – | D % | C 2% | B % | – |
| Lab 10 – Real Estate | NS 31% | – | D % | – | B 41% | A 10% |

FIG. 1

| Population 281/974 29% | 255 | 245 | | |
|---|---|---|---|---|
| Lab 1 – Do As I'm Doing | NS 54% | D 46% | - | - |
| Lab 2 – Pizza | NS 59% | D 2% | B 7% | A 30% |
| Lab 3 – Hybrid Car | NS 60% | D 3% | C 4% / B 7% | A 26% |
| Lab 4 – Plinko | NS 65% | D 10% | C 1% / B 2% | A 21% |
| Lab 5 – Plinko with Functions | NS 85% | D 5% | - | A 7% |
| Lab 6 – Hot Plate | NS 88% | D 2% | - | A 8% |
| Lab 7 – Restaurants | NS 100% | - | - | - |
| Lab 8 – Car Dealership | NS 96% | - | - | - |
| Lab 9 – Rock Paper Scissors | NS 100% | - | - | - |
| Lab 10 – Real Estate | NS 96% | D 2% | - | - |

Filtered Population — 210
Selected Category Cell — 230

FIG. 2

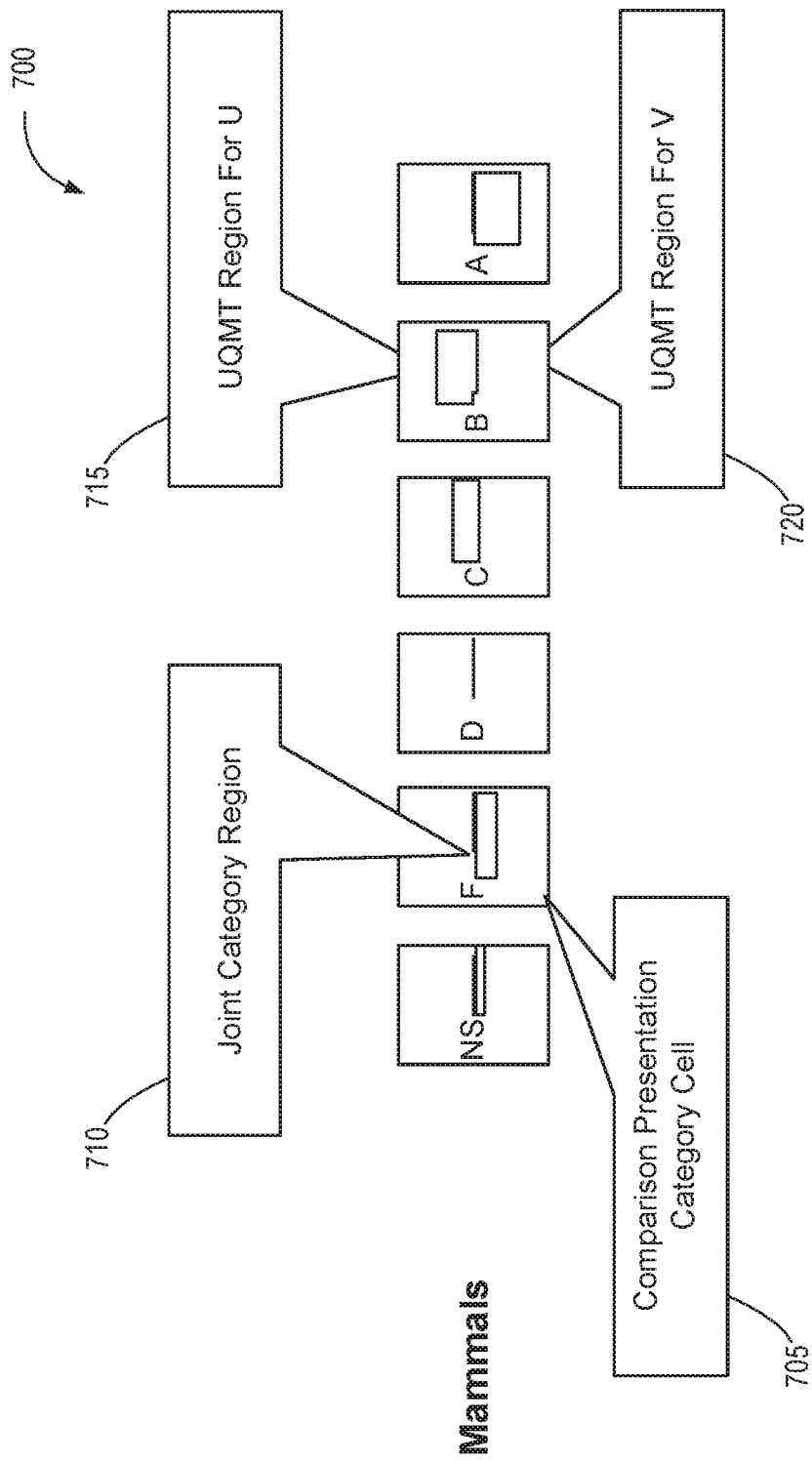

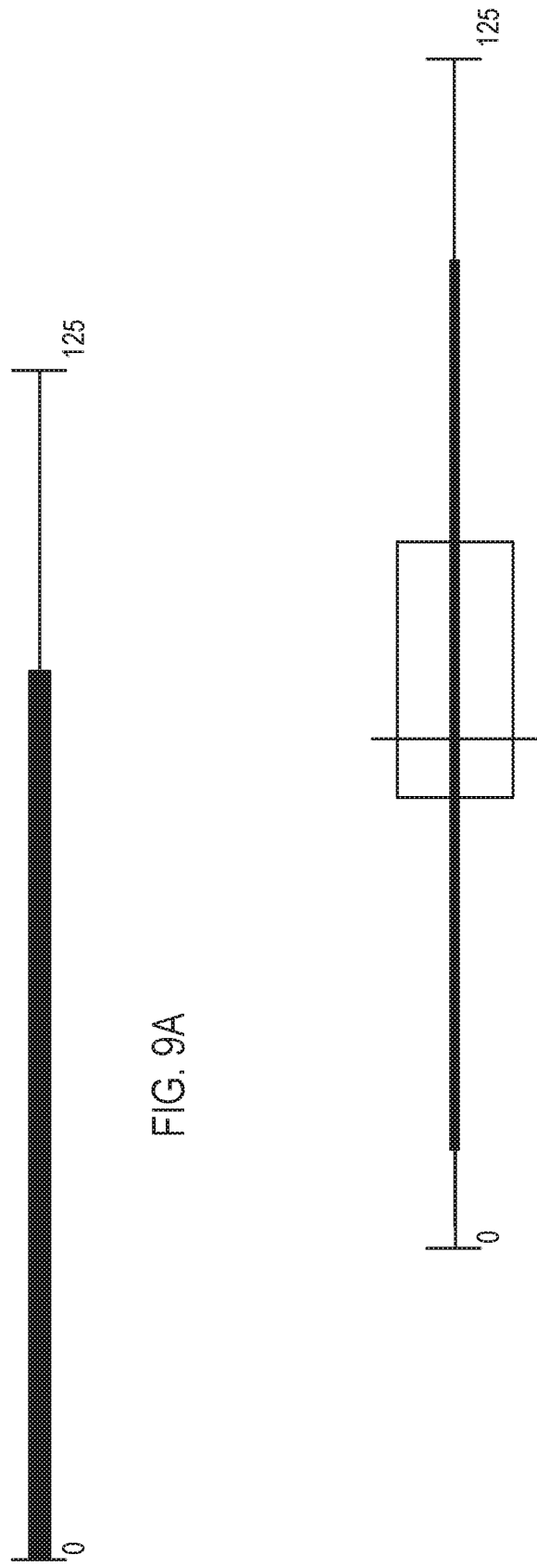
FIG. 9A
FIG. 9B
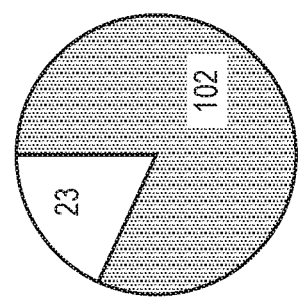
FIG. 9C

SYSTEMS AND METHODS FOR ANALYSIS AND INTERACTIVE PRESENTATION OF LEARNING METRICS

RELATED APPLICATIONS

This application is a continuation of U.S. patent application Ser. No. 16/127,193, titled "Systems and Methods for Analysis and Interactive Presentation of Learning Metrics," filed on Sep. 10, 2018 and issuing on May 12, 2020 as U.S. Pat. No. 10,650,698, which claims priority to U.S. Provisional Patent Application No. 62/556,303, titled "Interactive Presentation of Learning Metrics," filed on Sep. 8, 2017, both of which are hereby incorporated by reference in their entireties.

TECHNICAL FIELD

This disclosure relates to systems and methods for analyzing and displaying learning metric data from educational experiences of varying educational resources.

BRIEF DESCRIPTION OF THE DRAWINGS

This disclosure includes illustrative embodiments that are non-limiting and non-exhaustive. Reference is made to certain of such illustrative embodiments that are depicted in the figures described below.

FIG. 1 illustrates an example of a window displaying a quantized metric presentation, according to one embodiment.

FIG. 2 illustrates a window displaying a category-filtered presentation table, according to one embodiment.

FIG. 7B illustrates an embodiment in which the regions of the underlying QMT (UQMT regions) of each category cell overlap, according to one embodiment.

FIGS. 9A-C illustrate examples of metric attribute presentations, according to one embodiment.

DETAILED DESCRIPTION

Figure 3:
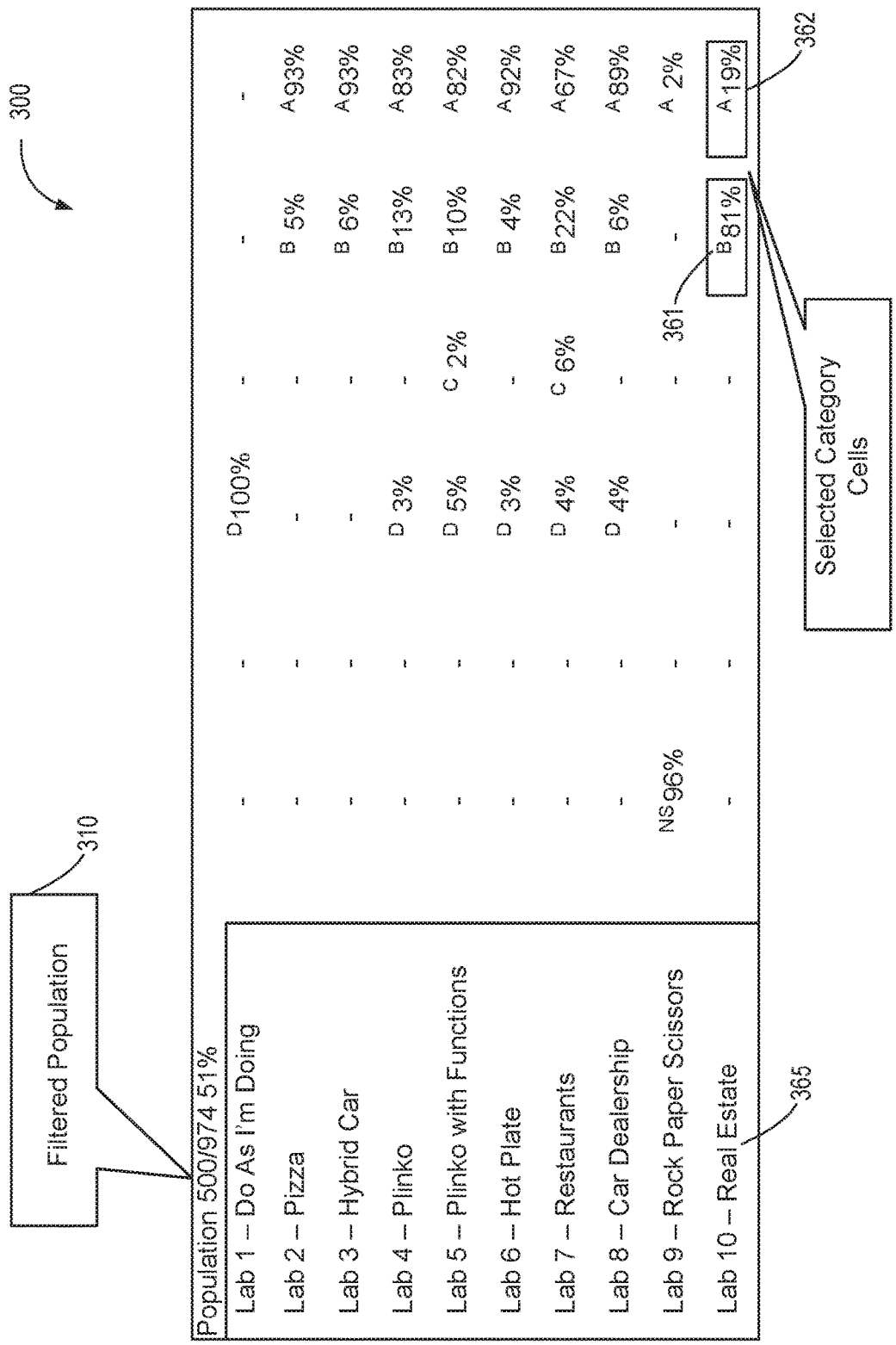
FIG. 3 illustrates a category-filtered presentation table with two category cells associated with a lab, according to one embodiment.

Educators, such as professors, teachers, aides, administrators, counselors, advocates, tutors, trainers, and the like can generally improve their instructional experience. An educator may modify an instructional experience by modifying a delivery approach, electronic resources utilized, content, examples, instructional order, and/or the like. Understanding how students (or other assessees) are performing or otherwise understanding material is very helpful. Specifically, it is helpful to understand the impact that a particular modification to the instructional experience has had or will have on student performance.

Identifying material with which students are struggling can guide educators' decisions on which modifications to the instructional experience will be most impactful to the learning experience. In various embodiments, a visualization tool allows educators to visualize the impact a modification or combination of modifications may have on learning. An interactive presentation allows educators to easily perceive selected data, explore reasons for student performance, and/or the consequences of particular modifications or combinations of modifications to the learning experience.

As used herein, the term "function" can relate to a mathematical function or a combination of code and/or data organized as a subroutine to be executed by a processor, as may be understood in the context of usage by one of skill in the art. Parameter passing is not necessarily implied, although it may be utilized in some embodiments. Particular "results return mechanisms" are also not necessarily implied, but again, these mechanisms may be used. Thus, the term "function" as used herein does not imply any constraints on implementation style.

A "learning activity" or simply an "activity" may be any measurable behavior or action performed by a student in the course of an instructional experience. Watching a video, reading a text, viewing images, and the like may be considered purely instructional and are measured by completion alone and/or the time required for completion. Quizzes, homework, examinations, tests, and the like may be evaluated and scored using one or more objectives and/or subjective rubrics or other evaluation criteria. That is, such activities may be scored numerically, by letter grade assignment, and/or on a pass-fail basis.

Some learning activities may be referred to as "aggregate learning activities" or simply "aggregates." An aggregate comprises one or more component learning activities. For example, a quiz, test, homework, assignment, or the like may comprise an aggregate of questions or problems, some of which may be related (e.g., sub-parts of a question or task) and others of which may be independent of each other.

All of the activities that apply to a sub-portion of an instructional experience may form an aggregate activity. A sub-portion of an instructional experience may be a particular chapter or set of chapters in a book, section or unit of a curriculum, or time period (e.g., a week, month, term, etc.). Aggregate activities may be used as a mechanism for grouping smaller activities together. An aggregate activity may comprise a plurality of aggregate activities as its component activities.

The term "population" may be used herein to refer to a set of students whose behavior metrics are being considered or evaluated. A population may be electronically represented as a specific set of data or be dynamically computed from other populations (e.g., by filtering and weighting of data, and/or based on a function of one or more other populations).

As used herein, the term plurality is meant to indicate more than one. The term "large plurality" refers to quantities in excess of approximately twenty (20). Many of the advantages and benefits of the systems and methods described herein are more readily apparent in the context of large pluralities. To the extent a human being may be able to mentally keep and process a plurality of data in his or her head, such metal exercises become impossible or unrealistic when considering large pluralities.

To avoid the constant usage of the adjective "large," many of the embodiments described herein refer to simply a "plurality." Such usage should be understood to encompass the more specific embodiments of "large pluralities." Thus, reference to a plurality of students can be understood to include embodiments of large pluralities of students. Similarly, references to a plurality of activities, metrics, outcomes, students, populations, assessees, assessors, etc. all encompass similar embodiments limited to "large pluralities" of the same.

As described herein, a wide variety of forms of data may be collected for each assessee (e.g., students). Metrics in their raw form may provide an overwhelming intractable amount of data. One approach to summarizing metrics into a more useable form is to quantize the values into a relatively small finite set of categories. A quantization function will take a metric as input and return a category as an output. A quantization function receives a relatively large range of possible metric values and reduces that range to a simpler set of categories.

In various embodiments, a quantization function may receive as inputs (1) a learning activity reference, (2) a metric selection, and (3) a student reference. The quantization function may return one or more categories. A learning activity reference may be any encoded data that identifies a particular learning activity. A metric selection may be an encoded data that identifies a particular metric. In various embodiments, a learning activity may have only one metric, in which case the metric selection may be implied rather than specifically encoded.

A student reference uniquely identifies a student relative to the set of students whose performance is being studied or visualized. In some embodiments, a student reference may contain information identifying the identity or attributes of a particular human being. In other embodiments, a student reference may not contain any information about the identity or attributes of a particular human being.

For example, the interactive presentation system (or a parallel system, such as a learning management system) may assign each student or section of students (e.g., 25, 100, or 15,000 students) a unique number (e.g., a random number). For visualization and interactive presentation of the collective data of one or more assessees, one or more student references may be used to associate an individual or set of individuals with their respective learning metric(s).

Various embodiments of an interactive visualization system may utilize one or more of a wide variety of quantization functions. Different quantization functions may have different strengths and weaknesses in informing a user (e.g., an educator) about the performance of an assessee (e.g., a student) or group of assessees. One example of quantization of metric values is a simple fixed set of "buckets" or "bins."

In such an embodiment, if a metric has a range from 0 to 100, then we can create 10 categories for each of the ranges 0-10, 11-20, 21-30 . . . 81-90, and 91-100. In some embodiments, an interactive visualization system may divide a metric by its maximum possible value and multiply by 100 before selecting a range, thereby adapting a quantization to any range from 0 to the maximum value of the particular metric.

Some metrics, such as time on a task, may not have a fixed maximum. Similarly, the concept of a maximum may not be applicable to some metrics, such as pass/fail-type metrics. For some metrics, the interactive visualization system may determine mean or median values for sets of data. The system may determine a standard deviation for the metric of each assessee. The standard deviations can be quantized within sub-ranges (bins or buckets) suitable for the particular standard deviations.

As another example, N values for a particular population of students can be sorted into ascending order. The system can then create C+1 categories by creating range boundaries using the values vals[0], vals[N/C], vals[2N/C], . . . vals[(C−1)N/C], vals[last] to generate a quantization of uniform probability for each category. In some embodiments, given a population of N metric values for student activities, the system may apply a clustering algorithm to divide the N metric values into C clusters or categories. Examples of suitable algorithms that are known in the art include, for example, K-means clustering, agglomerative clustering, other clustering algorithms, adaptations thereof, and combinations thereof.

In some instances, an activity may be graded, or otherwise assessed, using a rubric or finite set of criteria with which the activity is evaluated. A given activity may be evaluated by multiple rubrics and thus a given activity performed by a single assessee may produce a plurality of metrics for visualization and interaction therewith. The system may use a quantization function that defines one or more category for each rubric criterion and returns, as the result of the quantization function, the set of rubric categories that apply to a particular student's activity.

In some instances, one or more metrics for a particular assessee may be missing due to computer error, data loss, or the assessee failing to complete a particular activity. For instance, if a student does not participate in a particular activity, or grading has not yet been completed, no metrics will be recorded for that category. In such embodiments, the system may develop special categories for metrics of these assessees, such as "not submitted," "not available," "not graded," or the like.

As used herein, the term "metric data source" references a set of learning activities associated with (1) one or more metrics, (2) a population of students, and (3) metric values for each combination of (i) activity, (ii) metric, and (iii) student. The data may be "sparse" in the sense that for some combination of activity, metric, and student there may be no value (as discussed above). Not all activities have the same metrics and thus the metric data source can be a combination of code and data such that given an activity reference, a metric selection, and a student reference, a metric value is returned (or an indication of its absence). This can be represented in functional form as:

$$\text{mds}(\text{activity}, \text{metric}, \text{student}) \rightarrow \text{metric} \qquad \text{Equation 1}$$

Any combination of activity, metric, and student may be used in the function labeled as Equation 1 above. This representation of a metric data source is notational and can be implemented in any of a wide variety of ways using hardware, firmware, software, or a combination thereof.

An interactive visualization system may define an Aggregated Metric Data Source (AMDS) as a special case of a metric data source. Aggregate learning activities may have their metrics computed from their component activities to form an AMDS. There are a variety of ways to aggregate a metric value from its component metrics, including, for example, summing, averages, weighted sums, maximum, minimum, and the like, including combinations thereof.

As described and used herein, an AMDS is independent of the mechanisms for computing the aggregate values. In various embodiments, a recursive function is used to compute the aggregate metric values from the component values.

An interactive visualization system may use a quantized metric data source expressed per the function represented in Equation 2 below:

$$\text{qmds(quantize,mds,activity,metric,student)} = \text{quantize} \\ (\text{mds(activity,metric,student)}) \rightarrow \text{category} \qquad \text{Equation 2}$$

Using the function described in Equation 2, the system may assign category values for all the information in the metric data source. Interactive tools of the system may utilize the categories for presentation and modifications thereto based on interaction inputs, as described herein.

In some embodiments, an interactive visualization system may generate a new metric data source that includes information from two or more metric data sources. This can be represented as a new data source, C, that is composed of elements A and B, such that C=compose(A,B). The action of C can be defined by the function shown in Equation 3 below:

$$C(\text{activity,metric,student}) = \text{If } (A(\text{activity,metric,student}) \text{ exists}) \text{ return } A(\text{activity,metric,student}) \text{ else} \\ \text{return } B(\text{activity,metric,student}) \qquad \text{Equation 3}$$

In the example above, information in source A is given precedence over the information in source B. Since the composite metric data source is itself a metric data source, the compose function shown in Equation 3 can be used to compose an arbitrary number of metric data sources into a single source. The composed metric source may use its original metric sources for information or may combine and cache the data for direct access. The result of the compose function behaves similarly to, can be used as, and/or may have similar properties to the original data sources.

In some instances, the system may compose two metric data sources that have the same or similar learning activities and different student populations. The system may thereby generate a composition that forms a new metric data source with even more data from a greater population. For example, multiple sections of an educational course may be combined into a composite metric data source that contains the data across all sections. Users of the system may benefit from being able to see and interact with data from each individual section, as well as with aggregate data from multiple sections.

In some instances, the system may compose two metric data sources that have different learning activities but share all or parts of their student populations. Such a composite allows for the analysis of student performance across a wider range of activities. For example, a set of students may have taken course A followed by course B, and a metric data source may exist for each course. The system may compose the two metric sources from courses A and B to enable a user to visualize and interact with data showing, for example, the impact (e.g., correlation, causation, etc.) that performance by a student in course A has on his or her performance in course B.

The system may construct a quantized or quantization metric table (QMT) from a metric data source. A QMT comprises a set of learning activities, each with one or more metrics, a quantization function for each [activity, metric] tuple, and a student count for each of the quantization categories. A QMT may perform the function shown in Equation 4 below:

$$\text{qmt(activity,metric,category)} \rightarrow \text{number of students} \\ \text{whose metric for that activity fits in the specified category} \qquad \text{Equation 4}$$

If an activity has only one metric then the metric can be assumed, in some embodiments. For example, the system may assume that each metric has an associated quantization function. One embodiment for building a QMT from an activity associated with a metric data source is shown below:

```
Construct(mds):QuantizedMetricTable {
    let result = new QuantizedMetricTable( );
    foreach (student S in mds){
        foreach (activity A in mds){
            foreach (metric M associated with A) {
                let cats=M.quantize(mds(A,M,S));
                foreach (category C in cats){
                    add 1 to result[A,M,C];
                }
            }
        }
    }
    return result;
}
```

The implementation above is merely an example of an implementation and it is appreciated that a system may be configured to construct a QMT using a wide variety of hardware, firmware, software, or combinations thereof.

The system may filter the student population of a QMT by selecting one or more of the [activity, metric, category] tuples. The system may create a category-filtered metric table (FMT) as a type of a QMT where zero or more of the [activity, metric, category] combinations have been selected for a particular data set. User selections and/or system selections may define a "category predicate function" of various criteria to select a subset of students for inclusion in a population. The category predicate function can be applied to the metric(s) of each student to determine which student(s) should be included in the population. An example of pseudocode for an FMT is provided below:

```
constructFMT(mds,selectedCategories):FilteredMetricTable {
    let result = new FilteredMetricTable( );
    foreach (student S in mds){
        if (selectedCategories.matches(mds,S)){
            foreach (activity A in mds){
                foreach (metric M associated with A) {
                    let cats=M.quantize(mds(A,M,S));
                    foreach (category C in cats){
                        add 1 to result[A,M,C];
                    }
                }
            }
        }
    }
    return result;
}
```

Modifications above allow the inclusion of the selectedCategories as a parameter and the use of a selectedCategories.matches( ) function to test students for inclusion in the metrics.

The selectedCategories parameter may be a combination of data and code that represents the set of selected [activity, metric,category] combinations. The system may utilize selectedCategories as including the following functions:

.select(activity,metric,category)—sets the combination [activity,metric,category] to the selected state.
.unselect(activity,metric,category)—sets the combination [activity,metric,category] to being unselected.
.isSelected(activity,metric,category)→boolean—indicates if the combination [activity,metric,category] is selected.
.hasSelections(activity,metric)→boolean—indicates if there are any categories that have been selected for this [activity,metric] combination.
.matches(mds,student)→boolean—indicates if the data in the mds for the given student matches the predicate defined by the current selections.

The functionality of the matches(student) function can be defined as follows, for example:

The matches(student) function can be defined as follows, for example:

```
sc.matches(mds,student):boolean {
    foreach (activity A in mds){
        foreach (metric M associated with A){
            if (sc.hasSelections(A,M)){
                let cats = M.quantize(mds(A,M,S));
                foreach (category C in cats){
                    if (!sc.isSelected(A,M,C))
                        return false;
                }
            }
        }
    }
    return true;
}
```

The [activity,metric] combinations that have no selected categories are ignored by the filter. Thus, if there are no selected categories, a category-filtered table is the same as an ordinary QMT. If an [activity,metric] combination does have selected categories, then categories returned from the quantization function match a selected category.

The interactive visualization system receives input events from one or more users via one or more user interface devices. Examples of such devices include a touch implement, a joystick, a mouse, a keyboard, a gesture-based input, a haptic response, a temperature change, a touch screen input, eye movement, hand gestures, voice commands, and the like. An input event can be any sensory response to an action taken by a user that can be defined spatially and/or temporally. A wide variety of touch screen technologies may be employed. A locator device may be a hardware/software combination that can identify an input event with a particular [X,Y] location on the screen.

The systems and methods described herein allow for a user to visually distinguish between various members of populations and presentations of information. A portion of the presentation can be described as "visually salient" when it is displayed in a way that is distinctly different (i.e., readily distinguishable or recognizable) from other portions of the presentation.

The system may process metrics as described above and output a "metric presentation" on a graphical display (e.g., a digital display) as a set of learning activities along with information about the student population for each [activity, metric] combination. The system may also generate a quantized metric presentation (QMP) for display on a graphical screen for the information in a QMT. Such a presentation may include a list of "activity metric regions" defined as a region of pixels associated with a particular [activity,metric] combination. Such a list of activity metric regions may be organized either vertically or horizontally.

Each activity metric region may include an activity metric identification region that contains a graphical presentation of information that identifies an [activity, metric] combination. In various embodiments, the activity metric identification region includes a textual name for the activity and/or for the metric. For example, the activity metric identification region may include icons, images, or other information that identify the activity and metric. If there is only one metric for an activity, information about the metric may be omitted because it is implied.

A system may be implemented to allow for visual analysis of correlations, causation, and/or other data relationships. In other embodiments, a system may be implemented to execute specific actions in response to automatically identified data relationships. For example, a system may be developed to provide academic intervention for current students based on a determination that their performance correlates to the performance of past students who have failed or performed poorly.

For example, an academic intervention system may include a data store to store a plurality of activities associated with an educational course. Each student who participates in the educational course may participate in each activity and be assigned a metric value. Examples of activities for an educations course include tests, quizzes, homework assignments, attendance, lab assignments, exams, etc. Metric values may be automatically assigned, e.g., via automated multiple-choice grading, or manually assigned by a professor. Metric values may include, for example, letter grades, numerical ranges, a pass or fail designations, attended or did not attend designations, percentages, percentiles, a numerical deduction from a maximum, or the like.

A quantization subsystem may quantize the metric values of each respective activity into a set of quantized bins. Each quantized bin may be associated with a metric value range and includes a count of the number of students whose metric values for the respective activity are within the metric value range. A presentation subsystem may interact with an electronic display, processor, memory, data store, or the like to display a quantized metric presentation (QMP), according to any of the embodiments described herein. For example, the QMP may include a listing of the plurality of activities along a first axis of a table (e.g., the vertical axis) and the quantization bins along a second axis (e.g., the horizontal axis). Any number of quantization bins may, be associated with each activity and each quantization bin may be associated with a particular metric range and display a count of the number of students that fall within that metric range for the given activity.

As previously described, any of a wide variety of input devices may be used to select an outcome or metric value of a subset of students. An input selection module operating in conjunction with computing device may receive the user input. A filtering subsystem may cause the electronic display to display a category-filtered presentation table that includes the count of each quantized bin for each activity relevant to the selected subset of students.

To implement effective interventions and help students before it is too late, a behavior subsystem may identify one or more learning behaviors or weighted function of learning behaviors determined to correlate with the outcome or performance common to the user-selected subset of students displayed via the category-filtered presentation table. In many embodiments, learning behaviors are defined in terms of activities and metric values. For example, a learning behavior correlated with failing a final exam may be a metric value indicating a poor performance on a pre-test activity.

The category-filtered presentation table allows for the immediate visualization and automated-identification of unexpected correlations that can be identified as highly correlated learning behaviors associated with specific educational outcomes. An example could be a correlation between C and D grades and missing attendance during a specific week of the semester. It may be unexpectedly determined that attendance (or lack thereof) during a particular week (an attendance-based learning behavior) is highly correlated with high performance (or poor performance) on an exam. It may be that attendance or non-attendance during other weeks is not correlated or only weekly correlated with performance on the exam.

An analysis of prior students from one or more prior semesters may enable the identification of one or more learning behaviors. The intervention system may include a current-student analysis subsystem that analyzes current student performance to identify those students who are exhibiting previously identified learning behaviors correlated with positive or negative outcomes. An action subsystem may implement at least one intervention action for the identified current students.

For example, and as described elsewhere herein, the action subsystem may send a message to the students, inductor, counselor, parent, guardian, teaching assistant or other entity that can step in and provide substantive intervention before the student fails or otherwise performs poorly. In some embodiments, the action subsystem is may automatically adjust or modify the required activities for the current students exhibiting the identified learning behavior. For example, poor performance on a lab identified as a learning behavior highly correlated to success in the course may result in the system assigning make-up labs, additional reading, or extra homework to the identified students.

In such embodiments, the action subsystem creates a dynamic course curriculum based on student performance on activities determined to be important learning behaviors. The action subsystem may, in some embodiments, decrease the number of activities assigned to students identified as exhibiting learning behaviors of highly successful students.

The embodiments of the disclosure are described below with reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps or sequences of steps need to be executed only once or even in the same order in subsequent repetitions. Finally, as used herein, the term "set" may include a non-zero quantity of items, including a single item.

FIG. 1 illustrates an example of a window displaying a quantized metric presentation 100. An activity metric region 110 may contain a graphical presentation of information that identifies an [activity, metric] combination. An activity metric identification region 120 may have interactive elements for hiding/showing components of an aggregate activity, selecting quantization functions, hiding/showing various metrics, or other such interactive tasks.

If an activity is showing multiple metrics, the activity metric identification region 120 for each metric may share the same pixels for presenting the activity description that such metrics share. The activity metric identification region 120 also includes a category cell 130 for each category for that particular [activity, metric] combination.

As previously described, the categories may be derived from a quantization function used to quantize the information for the particular [activity, metric] combination. Each category cell 130 may contain information about the category as well as information about the number of students from the QMT.

As illustrated, the metric for each activity is a score. A quantization function operates to convert the scores into letter grades. For example, scores of 90%-100% may map to an "A," scores of 80%-89% may map to a "B," and so on. Each category cell 130 displays the percentage of the student population (studentCount/totalStudents*100) that scored in that category. The information about the category is shown as a letter grade and the information about the students is shown as a percentage. The information about students may be shown as actual counts, fractions of the total, or some other information.

In addition to the display of category information, the system may modify the visual appearance of one or more category cells to reflect the student count information. For example, the system may modify category cells 130 to display a dash (-) if the count is lower than a threshold number, thereby making such cells less visually distinct.

Though not illustratable using black and white line drawings, the system may interpolate the background color of each cell from a default color (e.g., white) according to the percentage of students whose scores fall in that category. Accordingly, the system may display cells with more students as more visually salient, as defined above, than those cells with fewer students. The appearance of cells may be modified in any of a wide variety of manners.

For instance, the system may modify a cell width, cell color, font size, font style, box widths, highlighting, outlining, etc. based on the number of students in the given category. As another example, one or more vertical and/or horizontal bars may be displayed that vary in size based on the number of students. These examples are, of course, not exhaustive.

Each approach for making important cells (e.g., those with more students) more visually salient may have different advantages and disadvantages. Some approaches may be more particularly, or even uniquely, suited to specific display environments and/or data types. Regardless of the approach utilized, the visual salience of important cells aids human users in quickly recognizing patterns in the QMT.

As previously described, the system may allow a human user to interact with the quantized metric presentation 100. A user may, for example, select which metrics are displayed. User selections may be applied to a single activity or to multiple activities. A user may interactively manipulate which metrics are displayed to gain additional understanding of student behavior through dynamic visualization.

For example, the scores for each activity may reflect student performance, while the time spent on each task for each activity reflects student effort. A user may instruct the system to display both the scores and the time spent on each task via one or more interactions that dynamically allow for a comparison of effort against performance.

The system may allow a user to interactively select between a plurality of quantization functions. The system allows a user to interactively select a quantization function to be applied to a single displayed metric, a subset of displayed metrics, or to all of the displayed metrics to be used. Accordingly, the system dynamically supports a wide variety of interactive selections to enable active exploration of the data by the user.

In various embodiments, the system allows for interactive manipulation of a category filter table (also referred to herein as a category-filtered metric table or an FMT) instead of or in addition to a QMT. In such embodiments, a category filter table presentation maintains selectedCategories, as described herein, in addition to the category-filtered table on which the presentation is based. The system may enable a user to interactively select and unselect category cells in the presentation. When category cells are selected, the .select (activity, metric, category) function is called to modify the selectedCategories information. Similarly, when category cells are unselected, the .unselect(activity, metric, category) function is called to modify the selectedCategories information.

The system effectively reconstructs the category-filtered table based on the dynamic changes to the selectedCategories information and modifies the displayed presentation to reflect the updated student counts in the category-filtered table. The system may call the .isSelected( ) function for each category cell on the selectedCategories to determine if each given cell is selected. The system may modify the appearance of selected cells to provide visual salience with respect to the unselected cells. That is, the system displays the selected cells with a distinctly different appearance from the unselected cells so that human users can easily understand which cells have been selected to filter the student population.

FIG. 2 illustrates a window displaying a category-filtered presentation table 200 where the "not submitted" (NS) category 230 for the "Lab 7—Restaurants" activity 220 has been selected. The score metric may be implied. The illustrated embodiment shows an interactive selection of all students who did not submit lab 7 and recalculates the category counts based on this new population. The optional "filtered population" display 210 in the upper left of FIG. 2 shows that only 29% of the original student population is currently being displayed based on the selection. One can readily see from this new presentation that over half (54%) of the students, at 255, who did not submit Lab 7 220 also did not submit the first lab, "Do As I'm Doing" 205, and the remaining 46% of the students who did not ultimately submit Lab 7—Restaurants 220 got a D-grade on the first lab 245.

The flexibility and power of the interactive visualization system are illustrated by a comparison of FIGS. 1 and 2. The relatively simple interactive user-selection of the NS category 230 for Lab 7—Restaurants 220 causes the system to dynamically modify the displayed data. The updated display values convey to the user an instantaneously recognizable visual correlation between data values. For instance, it is instantly recognizable that 100% those students 230 who did not submit Lab 7—Restaurants 220 also failed to submit most of the other labs. Moreover, it can be quickly seen that poor performance (D grades 245 or NS 255) at the outset of Lab 1—"Do As I'm Doing" 205 is highly correlated with future poor performance.

FIG. 3 illustrates a category-filtered presentation table 300 with two category cells 361 and 362 labeled B and A, respectively, in association with Lab 10—Real Estate 365. In the illustrated embodiment, a user has interactively selected both category cells 361 and 362 to filter the remaining metrics to show only those metrics associated with the students who merited a B or an A (361 or 362) on Lab 10—Real Estate 365. Specifically, the filtered population 310 represents approximately 51% of the total population.

Per the selectedCategories function detailed above, a student's score only needs to match one of these selected categories on the same [activity,metric]. The system allows a user to provide interactive inputs to select all those students who got either an A OR a B on Lab 10—Real Estate 365. These are the excellent students that have endured to the end of the course. Notice that 96% of these good students did not submit Lab 9.

Figure 4:
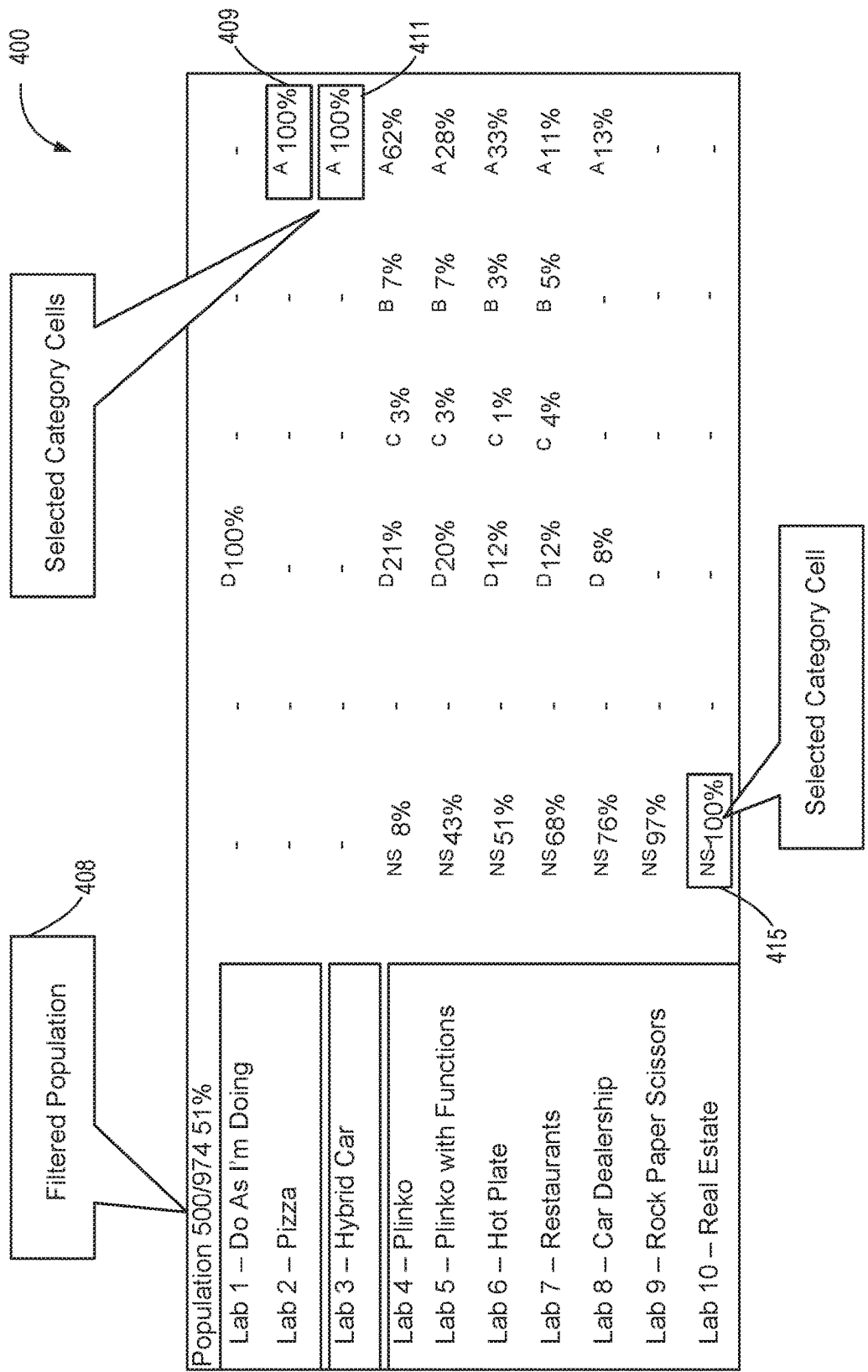
FIG. 4 illustrates a category-filtered presentation table with three category cells selected, according to one embodiment.

FIG. 4 illustrates a category-filtered presentation table 400 with three category cells selected. Specifically, a user has made interactive selections to cause the system to filter those students who are within category A 409 for Lab 2, category A 411 for Lab 3, and category NS 415 for Lab 10. These selections filter down to 8% of the student population 408. The system responds to these selections by filtering for only students that got A's on Labs 2 and 3 and then failed to submit Lab 10. Because each of the three selections is on a different activity, a student's scores must match all of these categories to pass the filter.

The selections are shown with boxes making the selected metrics visually salient relative to the unselected metrics. In other embodiments, various forms of highlighting, shading, colors, pulsing, blinking, moving lines, etc. may be used to visually distinguish the selected metrics from the unselected metrics. The selection reveals that between Lab 4 and Lab 5 the selected students went from excellent to failing. The system enables a user to visually compare and identify correlations, inconsistencies, associations, possible causations, etc.

The system may detect an input from a locator input device operated or actuated by a user. For example, the system may detect the location of an input on or relative to the display. A locator input device may be, for example, a mouse, joystick, trackball, pen, stylus, touch panel, or the like. Non-locator devices, such as buttons, switches, keyboards, and the like may also be used to provide inputs, albeit without providing location context relative to a displayed category-filtered presentation table.

In the illustrated embodiments, which are two-dimensional display embodiments, location input devices may provide an input at a definable two-dimensional location. The system may implement a function cellSelect(loc.x, loc.y) that takes an input and returns the identity of a selected cell, selected cells, or no cell at all. Most of the embodiments herein are described in the context of two-dimensional displays and corresponding two-dimensional category presentation tables or category-filtered presentation tables.

However, the systems and methods described herein can be adapted for three-dimensional displays. In one embodiment, a two-dimensional category-filtered presentation table is displayed on the three-dimensional display with three-dimensional visual properties (e.g., the appearance of depth), but the data itself remains two-dimensional and inputs from locator input devices are mapped to using the two-dimensional cellSelect(loc.x,loc.y) function. In still other embodiments, a three-dimensional category-filtered presentation table may be displayed on a three-dimensional display with three-dimensional data. That is, instead of rows and columns in a two-dimensional array (or matrix), the data may be visually presented on a three-dimensional display or hologram as a three-dimensional matrix. In such an embodiment, a three-dimensional cellSelect(loc.x,loc.y,loc.z) function may be used to select three dimensional cells or voxels.

Any of a wide variety of interactive techniques for selecting and unselecting cells may be utilized. For example, an on/off technique may use two different input events. A first "click" or "touch" or the like may operate to select a cell at the location returned by the cellSelect(loc.x,loc.y) function. A second "click" or "touch" or the like at the same location operates to de-select or unselect the cell. The system may utilize selectedCategories functions of select( ) and unselect( ) to modify selectedCategories, as described above. As previously described, examples of input events may be mouse button clicks, keyboard buttons in conjunction with a touch or mouse location (e.g., a mouse hover), keystrokes, popup menu selections, event combinations (click and shift-click). In some embodiments, two different inputs are used for selecting and unselecting. For example, a right mouse click can be used to select cells and a left mouse click can be used to unselect cells. Any two distinct events or different combinations of events can be used to select or unselect a cell, where an event comprises a detected input by any of a wide variety of input devices.

When an event is received, the system checks to see if the cell returned by the function cellSelect( ) is already selected by calling a function selectedCategories.isSelected( ). The selection status is toggled. That is, if the cell is already selected then it is set to unselected. If the cell is unselected, then the cell is toggled to a selected setting.

In other embodiments, a dragging technique is used based on input devices that can be held in active or "on" positions, such as button presses, stylus presses or long touches on a screen. The system can detect when an input device is initially pressed and call the function cellSelect( ) to identify the cell for which the selection status or state is to be toggled. The system may call the function cellSelect( ) to set or toggle the state based on the inputs. As the location device is moved, and while the held device continues to be held, the system may continue to call the function cellSelect( ) for each new cell location to toggle the selection state of each cell or set the selection state to a particular state based on the input. A held device enables an interactive user to change the selection of many cells in a single stroke.

Figure 5A:
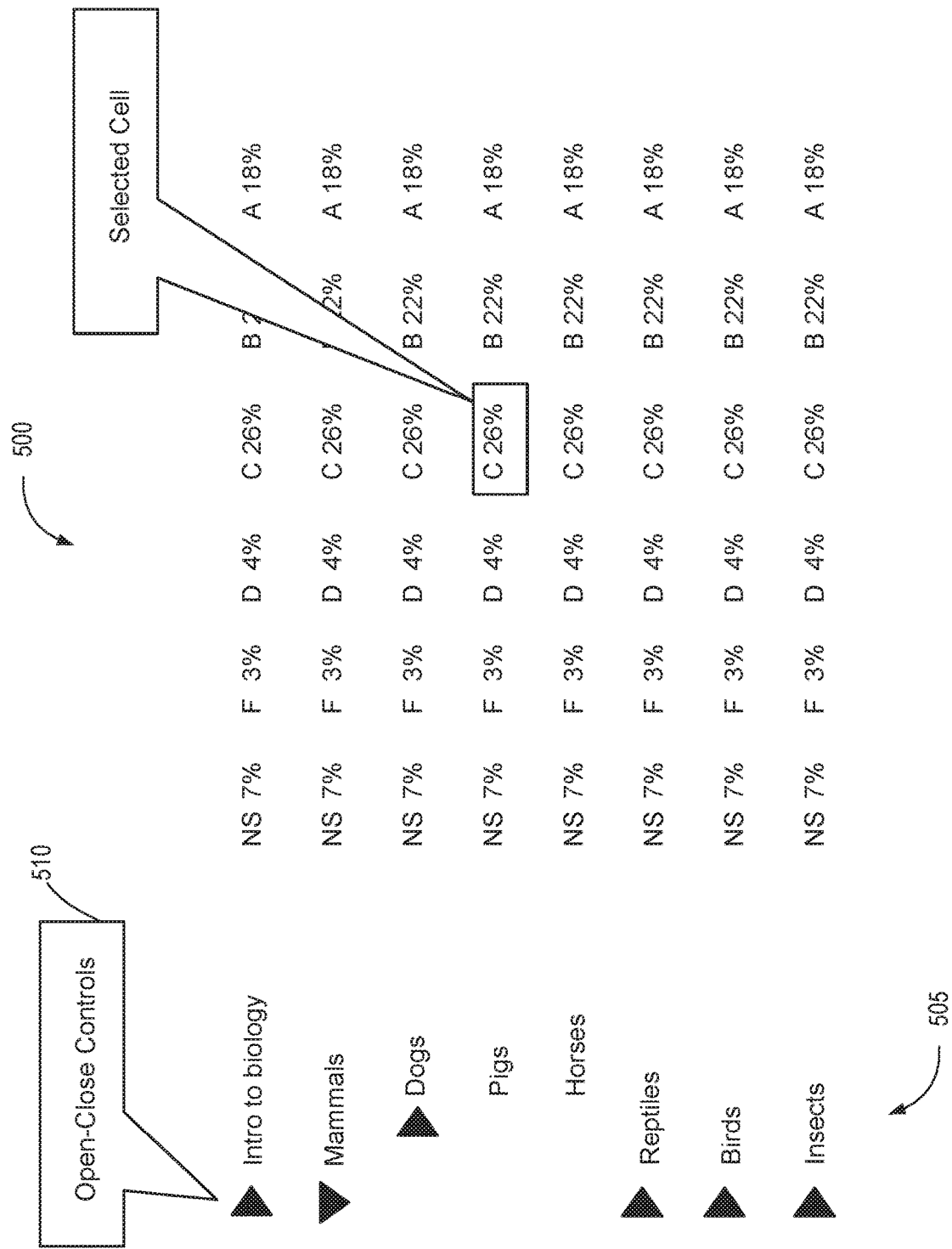
FIG. 5A illustrates a category-filtered presentation table with aggregate learning activities associated with open-close controls, according to one embodiment.

FIG. 5A illustrates a category-filtered presentation table 500 with aggregate learning activities 505 associated with open-close controls 510. The example aggregate learning activities 505 show "Intro to biology," "Reptiles," "Birds," "Insects," and "Dogs" closed, while the aggregate learning activity 505 "Mammals" is open.

The activities "Pigs" and "Horses" are not aggregate learning activities. In the example embodiment, aggregate learning activities are opened and closed by clicking on the open-close control 510 associated with the particular aggregate learning activity.

Figure 5B:
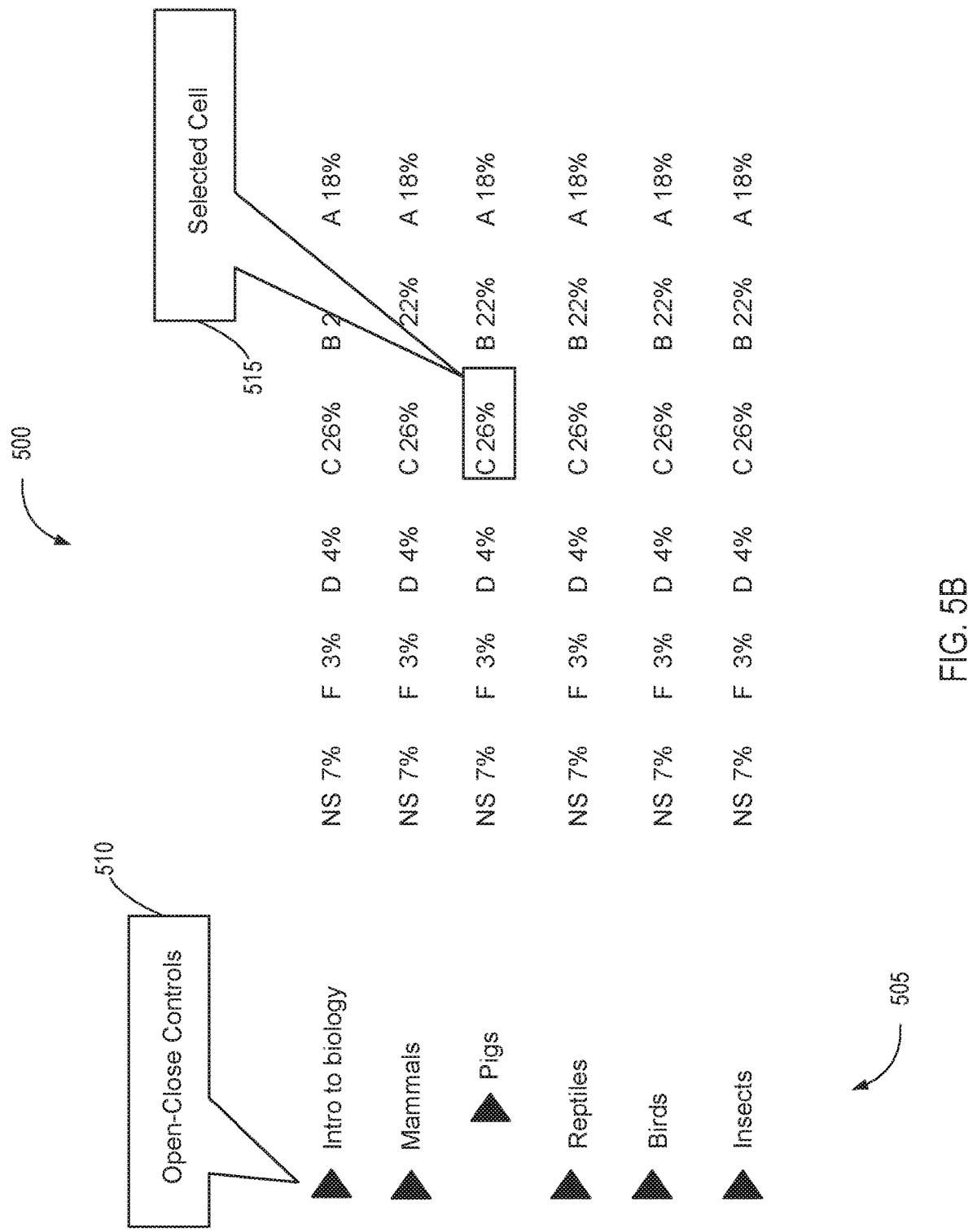
FIG. 5B illustrates a category-filtered presentation table with an aggregate learning activity closed, according to one embodiment.

FIG. 5B illustrates the category-filtered presentation table 500 with the "Mammals" aggregate learning activity 505 closed. When an aggregate activity 505 is closed, its components and sub-components, recursively, are removed from the presentation 500. However, any component or sub-component, recursively, that have selected categories, e.g., "Pigs" 515, is not removed. The set of selected categories dictates the population of students that is actually displayed. Hiding selected category cells would otherwise obscure the visual confirmation of how the population is selected. By retaining components and sub-components so that a function .hasSelections( ) is always true, the selections can be visually displayed in a distinctive manner to visually define the current population.

In some embodiments or instances, the system may not consider a full student population associated with a particular QMT or underlying metric data source. For example, some number of students may begin a course but decide soon thereafter not to complete it. The system may be configured to ignore early dropout students and analyze only those students who actively participated in the complete course. Similarly, an interactive user selection may cause the system to consider only those students who actually completed all of the assignments.

The system may add sufficient information to a quantized metric presentation 500 to visually indicate to a user whether the displayed information is provided relative to an entire population, or only a portion thereof. That is, the system may indicate which populations are in a state of "ignoring" and which populations are in a state of "analyzing."

The system may modify the quantized metric presentation 500 to store a special case of selectedCategories called ignoreCategories. The system modifies the quantized metric presentation to enable a user to interactively switch between the ignoring and analyzing states. When in the ignoring state, all cell selections will manipulate the ignoreCategories and the information presented will be filtered by the predicate derived from ignoreCategories. When in the analyzing state, all cell selections behave as otherwise described herein. In such an implementation, the underlying population of students is first filtered to only those students who do not match the predicate derived from ignoreCategories.

The system may facilitate outcome interactions that allow a user to visualize the information that best predicts a specified outcome. A user may provide interactive inputs to specify an outcome and the system may visually indicate a set of metrics that predicts the specified outcome. For example, a user may specify an outcome of all those students that were assigned a C or D on the final exam. The system may identify at least one [activity, metric, category] value combination that predicts the specified outcome.

The system may utilize the Bayes Theorem to quantify the probability that a particular category of performance predicts a specified outcome. The system may compute a probability that a student will appear in an outcome set given the student's performance on one or more [activity,metric] combinations within a category. The probability P(outcome|item) is computed, where the outcome is equal to the set of students defined by the currently selected categories and the item is an [activity, metric, category] displayed in a cell of a presentation.

The system may be responsive to interactive inputs from a user to display one or more probabilities expressed in terms of outcomes and/or items based on available metrics. Examples of such expressions include, for example:

$$P(\text{outcome}|\text{item}) = \frac{P(\text{item}|\text{outcome})P(\text{outcome})}{P(\text{item})}$$

-continued $$P(\text{outcome}) = \frac{\#\text{selected students}}{\#\text{students in population}}$$

$$P(\text{item}) = \frac{\#\text{category students}}{\#\text{students in population}}$$

$$P(\text{item} | \text{outcome}) = \frac{\#\text{filtered category students}}{\#\text{selected students}}$$

In the expressions above, "# selected students" represents the number of students who match the current selected categories; "# students in population" represents the number of students in the underlying metric data source; "# category students" represents the number of students in the underlying metric data source whose value for the item's [activity, metric] is within the item's category; and "# filtered category students" represents the number of students in the underlying metric data source whose data matches the predicate for the current selected categories and whose value for the item's [activity, metric] is within the item's category.

In various embodiments, a system may display two or more QMTs for visual comparison. The two QMTs may have many or all of the same learning activities but be based on different populations (that may or may not overlap). The system may display two or more QMTs to enable a user to visualize differences therebetween. In some embodiments, the system may highlight or otherwise render visually distinct, the metrics of the two QMTs that are most different or are sufficiently different to warrant highlighting.

The system may perform a "comparison presentation" of metrics from two or more quantization tables. The system enables users to conduct interactive investigations into the differences and similarities in the performances of the underlying populations. In some embodiments, a comparison presentation may utilize the "ignore selections" mechanisms described above to limit the populations being compared.

In some comparison presentations, there may exist some activities and/or metrics that are found in only one underlying QMT. In such cases, the corresponding activity metric regions may be presented and/or interacted with by a user as per the previously described embodiments. In other embodiments, [activity,metric] combinations found in only one underlying QMT may be omitted from the display because they contain no comparison information. In many instances, the system may generate a presentation for display on an electronic device that includes valuable comparisons of metrics from two or more underlying QMTs. The presentation may utilize various techniques for visually distinguishing or highlighting similarities, trends, differences, and/or outlier metrics.

For example, the system may generate a presentation that includes category cells with data contributed by two or more underlying QMTs. For example, the system may generate a presentation that includes a region within a category cell to display a metric from one or more underlying QMTs. Each region within a category cell can behave as per any combination of one or more embodiments of the category cells described above.

In some embodiments, a category cell may also contain a "joint category region" to store information about the comparison between cells and/or for information that is common across two or more of the underlying QMTs being compared. Two QMTs being compared may have all the same or some overlapping categories.

There are many useful reasons to compare two (or more) different QMTs. For example, if a professor teaches eight sections of two hundred students during a first semester, the QMT for the various tasks and events during the semester may originate from a student population size of 1,600. If the same professor teaches eight more sections of two hundred students, the QMT for the second semester may be generated with all the same event categories. Using the systems and method described herein, a comparison presentation of the two QMTs would, in its simplest form, allow for the professor to visually see which student population performed better. Additional uses outside of education are possible as well. For example, a comparison presentation approach may allow an employer to visually compare the QMTs of different, contemporaneous groups of employees.

By intentionally varying one or more variables over time (e.g., semester to semester) or in another controlled environment, a user of the system described herein may visualize the impact of a particular variation or combination of variations. Moreover, the user may visualize which sets or subsets of students are most impacted by such variations. Modifications to the instructional approach, materials, etc. can be identified to target a particular instructional goal.

Figure 6A:
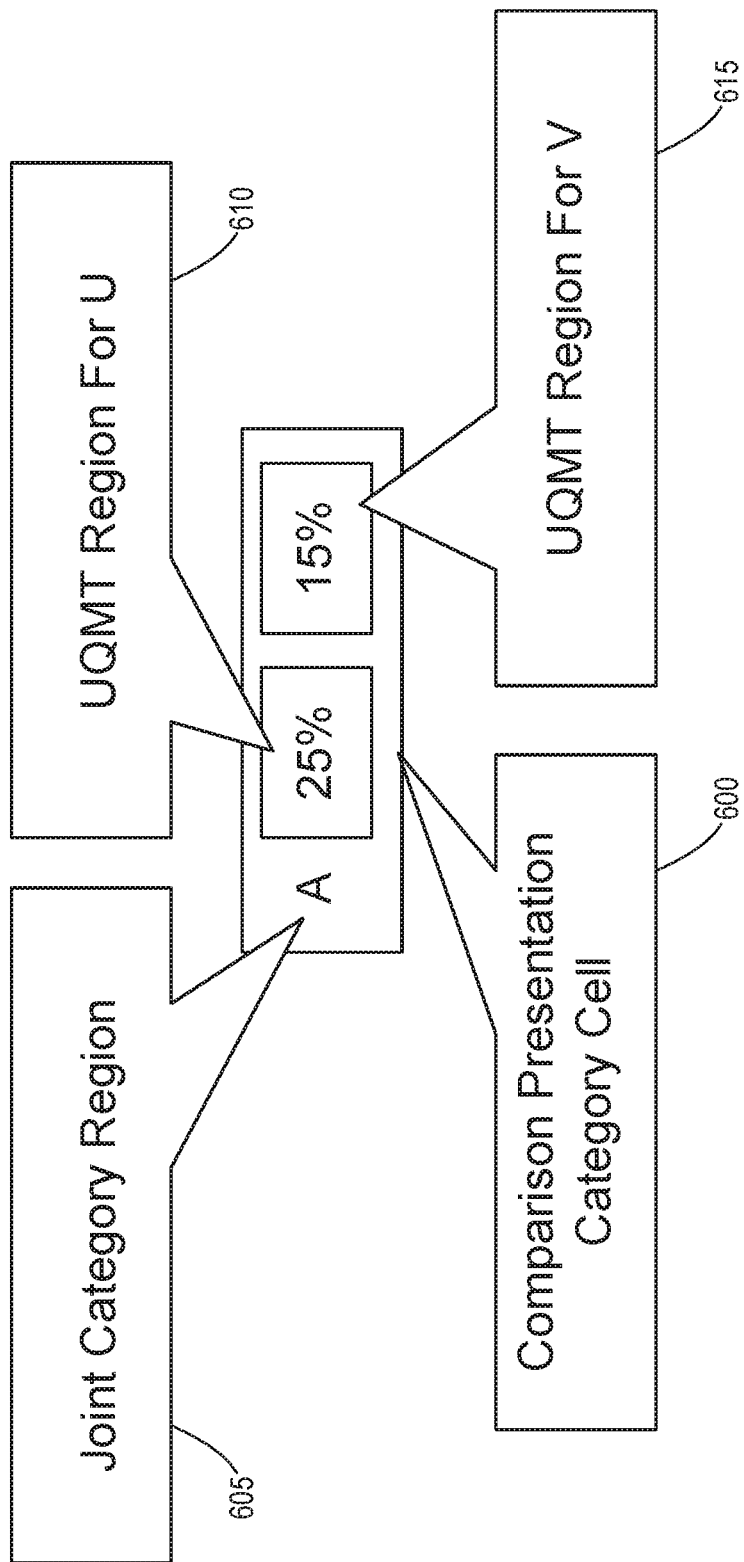
FIG. 6A illustrates a comparison presentation category cell for a first underlying QMT being compared with a second underlying QMT according to one embodiment.

FIG. 6A illustrates a comparison presentation category cell 600 for a first underlying QMT, U, being compared with a second underlying QMT, V. The underlying QMTs have different values for a metric in a category "A." Accordingly, a joint category region 605 is created for the category "A" that includes a UQMT region U 610 for a metric value from the underlying QMT U and a UQMT region V 615 for a metric value from the underlying QMT V. In various embodiments, the background colors of each UQMT region 610 and 615 may be interpolated separately from each other. The joint category region 605 can contain the shared information from the two underlying QMTs.

Figure 6B:
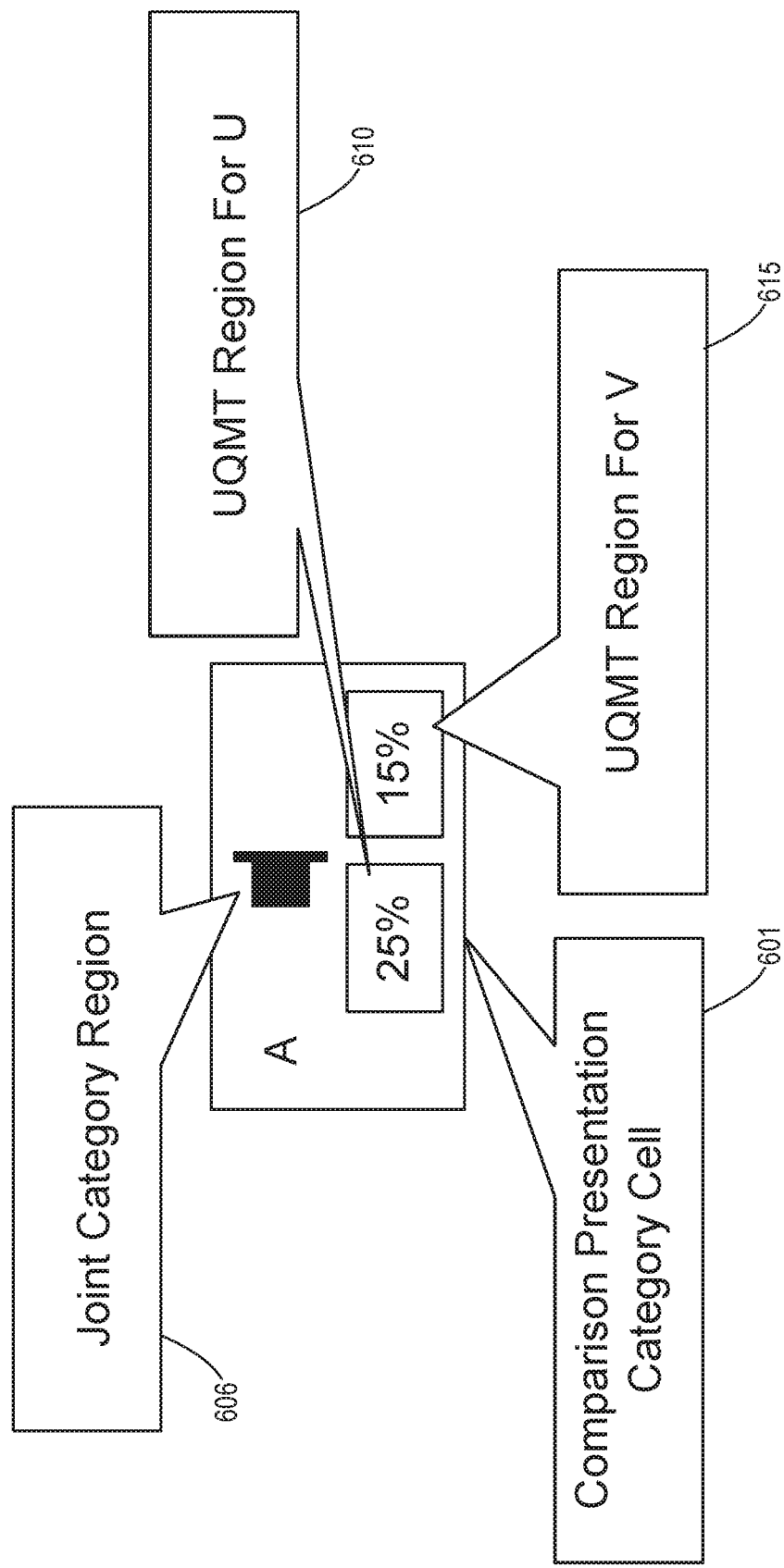
FIG. 6B illustrates another embodiment of a comparison presentation category cell for comparing the first and second underlying QMTs, according to one embodiment.

FIG. 6B illustrates another embodiment of a comparison presentation category cell 601 for comparing the first and second underlying QMTs. In the illustrated embodiment, the joint category region 606 contains a bar that visually indicates a magnitude of the difference between the two values. The vertical line shows the zero point of the difference and the bar shows how much larger the counts for U 610 are than the counts for V 615 in this category.

Figure 7A:
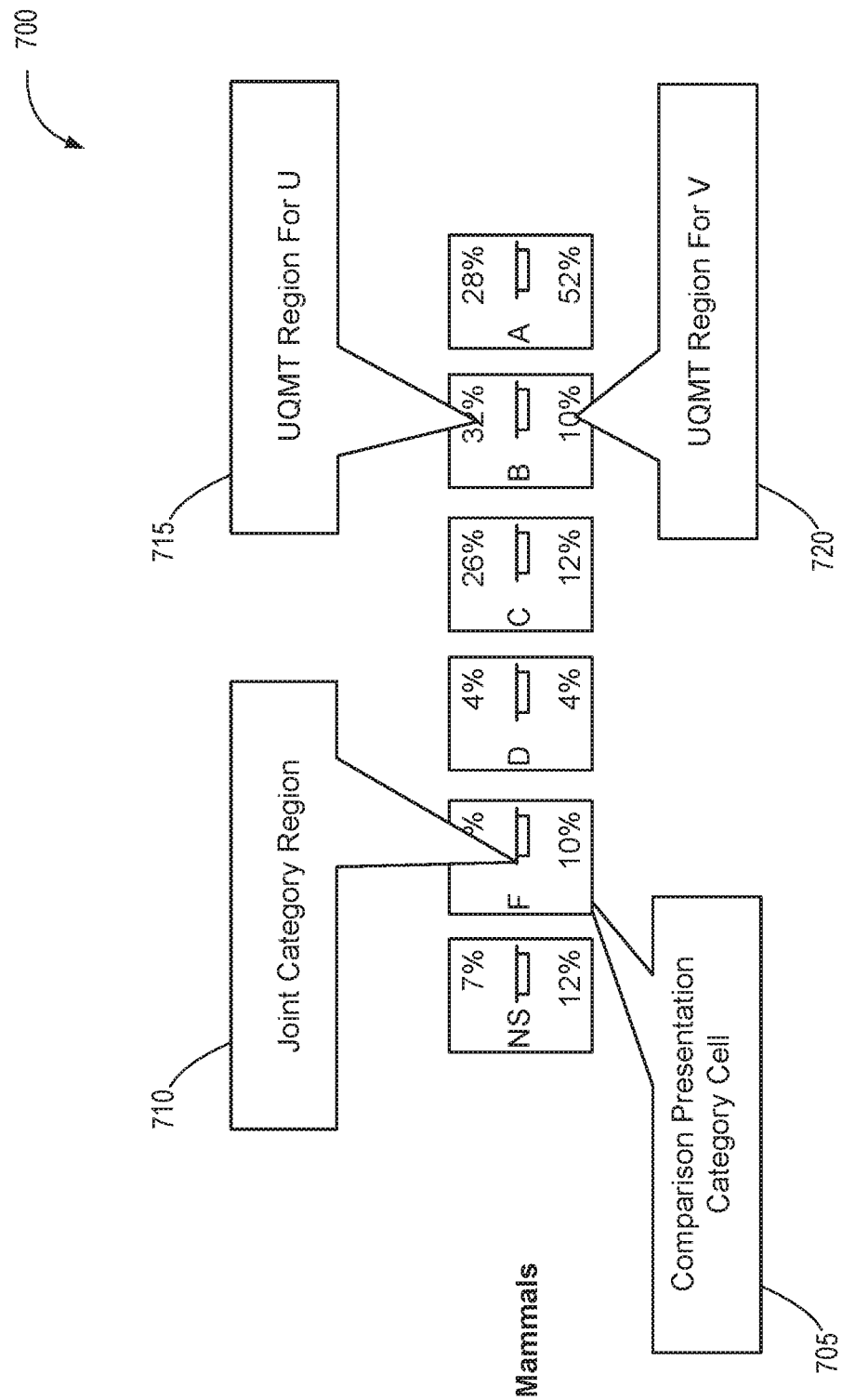
FIG. 7A illustrates an entire activity metric region with multiple comparison presentation category cells to compare two underlying QMTs, according to one embodiment.

FIG. 7A illustrates an entire activity metric region 700 with multiple comparison presentation category cells 705 for "Mammals" that compare two underlying QMTs, U and V. In this case, the joint category region 710 overlaps the individual UQMT regions for U 715 and V 720.

FIG. 7B illustrates an embodiment in which the UQMT regions 715 and 720 of each category cell 705 overlap with the joint category region 710 and display a visual indication of the difference between the metrics without actually displaying specific values.

The system enables users to selectively manipulate the comparison presentation consistent with the approaches described in conjunction with the quantized metric presentations and the category-filtered presentation tables. Each underlying QMT associated with a comparison presentation has its own set of selectedCategories. Many functionalities, such as the on/off, toggle, and dragging functionalities described above can also be used with the comparison presentation. In various embodiments, the system may generate a comparison presentation and utilize a selectCell function that returns the identity of the category cell for the particular location as well as the identity of the selected underlying QMT. If the location is within one of the underlying QMT regions of a cell, the identity of that underlying QMT is returned. Otherwise, no underlying QMT is returned.

The system may call the selectCell function and, if an underlying QMT is returned, the selection operation dictated by the input technique (on/off, toggle, drag, etc.) is applied only to that underlying QMT. If no underlying QMT is returned, then the selection operation is applied to all underlying QMTs. The ability to apply different selections to different underlying QMTs allows each underlying QMT to be explored differently and/or independently. The ability to apply selections to all underlying QMTs allows global filters to be applied so that similar sets of student behaviors can be compared.

Figure 8:
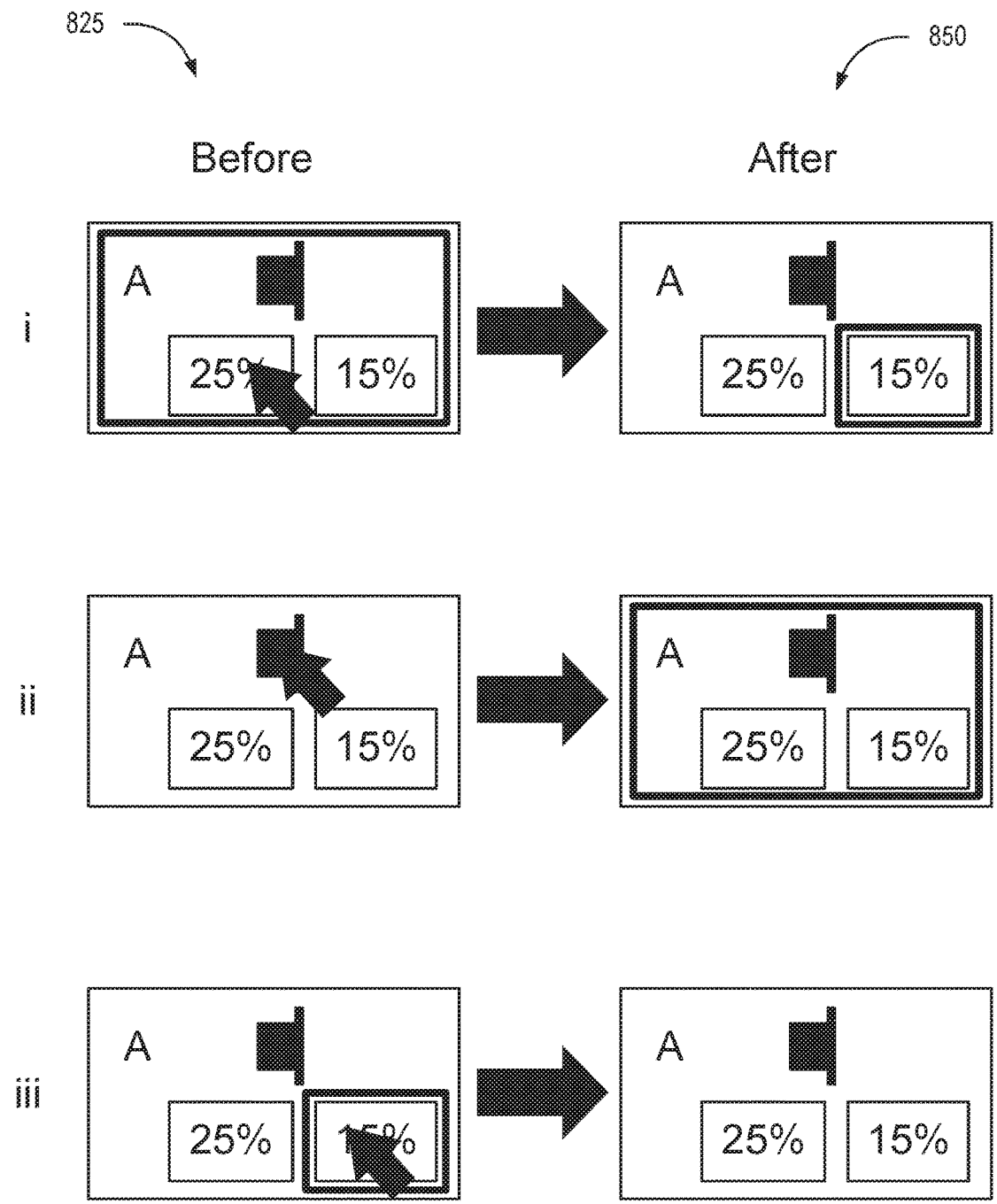
FIG. 8 illustrates examples of user-selections and system responses, according to one embodiment.

FIG. 8 illustrates examples of user-selections and system responses. Each of the cells in rows i, ii, and iii utilize a toggle selection approach. The Before Column 825 illustrates the selection status of the underlying QMTs prior to a user input at a location at the tip of the black arrow selector. The After Column 850 illustrates the selection status of the underlying QMTs after the user input at the location at the tip of the black arrow selector.

As illustrated, the cell in row i within the Before Column 825 shows both of the underlying QMTs selected, as indicated by the bold box encompassing most of the cell.

A user input (e.g., a mouse click) within the region where the 25% metric value is displayed toggles the selection state of the underlying QMT. The cell in row i within the After Column 850 shows that the underlying QMT associated with the displayed 15% metric value is selected, but that the other underlying QMT associated with the displayed 25% metric value has been unselected.

The cell in row ii within the Before Column 825 shows that neither of the underlying QMTs is selected. A user input is shown within the cell, but outside of the regions associated with the underlying QMTs (i.e., the boxed regions where the 25% and 15% metric values are displayed). The cell in row ii within the After Column 850 shows that the state of both of the underlying QMTs has been toggled to a selected state, as indicated by the bold box around most of the cell.

The cell in row iii within the Before Column 825 shows a bold box around the 15% metric value indicating that the selection state of the underlying QMT is currently "selected." The cell in row iii within the After column 850 shows that the underlying QMT associated with the displayed 15% metric value has been toggled to an unselected state.

The selection state in FIG. 8 is illustrated using bold boxes. However, the selection state of each underlying QMT may be visually indicated in any of a wide variety of manners, including alternative font colors, highlighting, shading, etc. The system may utilize any technique that makes the selected region visually salient relative to other unselected regions.

In some embodiments, the system may be configured to generate a complimentary comparison presentation of metric values from a single QMT. In such embodiments, the system may provide a visual comparison of two populations. Specifically, the system may provide a complimentary comparison presentation of metric values of a selected population of a QMT and the complimentary unselected population of the same QMT.

The selectedCategories function, or some other predicate, may define the portion of the population that is selected. The system may display the category cells in a format similar to the comparison presentation format used to compare multiple QMTs, as described above. User interactions with a displayed complimentary comparison presentation may be performed as described in conjunction with the single QMTs. This is because the predicate that defines one population (selected) implicitly defines the complimentary population (unselected). When there are no selections, a complimentary presentation may revert to the presentation for a single QMT.

Using a QMT of the performance of a set of students, an educator or administrator may interactively select some of the cells in a quantized interaction associated with a particular population. The educator may, for example, select one or more cells corresponding to a set of students associated with a particular educational outcome. The system may display a category-filtered presentation table filtered to show data associated with the selected population of students associated with the particular education outcome.

Using the visually presented data associated with the student population with the particular outcome, the educator can now identify which particular learning activities impacted the selected outcome. That is the visual category-filtered presentation table provides a graphical illustration of activity and metric data correlated with the student population with the particular outcome. Each cell with metric data remaining in the presentation can be considered a "learning behavior." A learning behavior, as used herein, can be considered a particular measured attribute of the learning of a set of students (the filtered population).

As a more specific example, an educator may select the cells for grades C and D on a final course grade. The system will filter the population to display metric data of activities that is relevant to those students receiving C and D grades for the course. The system may present the data in a category-filtered presentation table, as described herein. They system identifies those cells in the category-filtered presentation table that have the highest counts, percentages, Bayesian probability or other displayed metrics as those most likely to predict the selected C and D grade outcomes. The system may identify these cells as learning behaviors relevant to, or even causal to, the outcome of C and D grades.

In some embodiments, the system may also receive user input identifying one or more displayed metrics as being relevant to the selected C and D grade outcomes. A user may identify one or more learning behaviors. In many instances, the category-filtered presentation table may facilitate a visual analysis by the educator. An educator may visually scan and analyze the category-filtered presentation table to identify one or more learning behaviors that correlate to a high prediction of the selected C and D grade outcome.

The system may then automatically take one or more actions, advise the educator to take such actions, or otherwise report a recommended action based on the identified learning behaviors. In some embodiments, complete analysis(es) of one or more prior populations may be used to identify learning behaviors relevant to future populations participating in the same or similar set of activities.

For example, an educator may use populations of students from prior semesters to identify learning behaviors relevant to future populations of students participating in the same or similar activities. Throughout the semester, a professor may assign numerous homework assignments, in-class quizzes, exams, laboratory assignments, or other activities for completion by students. Various metrics may be assigned to each different activity as part of the evaluation process of each activity. Final grades may be distributed to each student based on their performance per a predefined rubric.

The system may generate a QMT using the metric data from the population of students in the prior semester. In some embodiments, students from multiple prior semesters may be aggregated as a single population for the creation of the QMT. The professor may provide interactive inputs to filter the QMT to filter to those students who obtained D and F grades. A category-filtered presentation table may show the metrics associated with those students who obtained D and F grades in the course.

The system (or the educator through visual analysis) may identify the learning behaviors that are highly correlated with the D and F grade outcomes. For example, those metrics with the highest counts may be identified as the learning behaviors most relevant to the D and F grade outcomes. The system (or educator through visual analysis) may initiate student interventions in future semesters when a student is associated with one or more of the identified learning behaviors, especially those learning behaviors deemed to be relevant or even causal. In some embodiments, it may be helpful to filter out the worst students or those that did not complete the course or significant portions thereof.

For example, the system or educator may send messages to all students that exhibit the identified learning behavior. The system or educator may recommend an action for remediation. For example, poor performance on a second laboratory activity may be determined to be highly correlated with a final grade of a D or F. The system or educator may send a message to each student who performed below a threshold metric on the second laboratory activity with a warning and/or recommendation for remedial action (e.g., redo the second laboratory activity or perform other makeup work).

In some embodiments, the system or educator may automatically assign a video, reading material, additional homework, or other additional activities to students exhibiting learning behaviors associated with outcomes of a C or below. A professor may also use the identification of certain learning behaviors as feedback that a concept is being taught or understood poorly. The professor may utilize the learning behaviors as feedback to improve or modify instruction.

In some embodiments, students exhibiting learning behaviors indicative of undesirable outcomes may be called in or automatically scheduled for office hour appointments with a professor, tutor, aid organization, or counselor.

Selected outcomes need not be negative. For example, an educator may provide interactive inputs to filter to the population of students that obtained A grades. The system or educator visually analyzing a category-filtered presentation table may identify those learning behaviors that are causal or highly correlated with the A-grade outcome as those learning behaviors having the highest counts. Those learning behaviors may be encouraged in future semesters and/or considered mastery behaviors. In future semesters, all students may be required to repeat the underlying activity until a satisfactory metric can be obtained for each mastery behavior. In some embodiments, students exhibiting positive learning behaviors may be exempt from some other activities to avoid wasting their time with activities intended to teach them things they already know.

In some embodiments, the system may produce a list of values instead of quantizing the information. The system may selectively implement a values function (e.g., mds.values(activity,metric)) to generate a list of values. The values function will return a list of the values of that [activity, metric] for each of the students in the population of the metric data source for the given activity and metric. Given a list of values, there are a variety of numeric attributes that can be computed from those values. For example, the system may compute a minimum, maximum, mean, median, mode, 25% quartile, 75% quartile, standard deviation, or other numeric attributes. The system may display one or more of the attributes along a numeric axis as a metric attribute presentation.

FIGS. 9A-C illustrate examples of metric attribute presentations. In FIG. 9A, the wide horizontal line represents the average for a set of values as part of a common bar graph element.

FIG. 9B illustrates a whisker plot in which the left end of the wide line corresponds to the minimum of the set of values, the right end of the wide line corresponds to the maximum of the set of values. The vertical line near the center is the median of the set of values. The left and right sides of the box represent the 25% and 75% quartiles of the set of values, respectively.

FIG. 9C illustrates another possible embodiment of a metric attribute presentation. As illustrated, the system may generate a presentation of set of values similar to that in FIG. 9A, except that the axis is circular rather than a line.

The mapping of number values to positions on an axis need not be linear. For example, the system may use a logarithmic mapping of numbers to positions on an axis. The system may implement a locToValue( ) function to process a geometric screen location from a mouse, stylus, or other locator device and return a corresponding numeric value. If the system determines that the location is outside of the space for the axis presentation, then it will return null or no-value. In some cases, only one of the location coordinates is required.

For example, if the system generates a metric attribute presentation in horizontal line format, such as the presentation in FIG. 9A, a vertical or y coordinate may be omitted as an input. The system may implement a valueToLoc( ) function that takes a value and returns a point on the display that represents that value.

In some embodiments, the system may implement a selectRanges function to determine a selected range as a tuple [activity, metric, lowerBound, upperBound]. A data object selectedRanges may be used to manage a set of one or more selected ranges. A user may select a range of data for display and interact therewith, as described herein.

The system may enable a user to make an interactive selection of attribute ranges to filter out some members of the population. The system may generate a range filtered metric attribute presentation and enable a user to explore data relationships between various sub-populations via input interactions.

In various embodiments, the system may generate a presentation that allows for a visual comparison of two or more metric data sources in a single metric attribute comparison presentation. The system may utilize data from two or more underlying metric data sources for such a presentation. The system may rely on user input defining value ranges to filter the metric attribute comparison presentation. For a given [activity,metric], the system may generate a presentation similar to one or more of the embodiments shown in FIGS. 9A-C for each underlying metric data source. As a specific example, a whisker plot may be generated for one or more categories in each of the underlying metric data sources. The system may generate the plurality of whisker plots for display on an electronic device. A user may interactively manipulate the ranges and population being compared via, for example, touch inputs on the electronic device.

Figure 10:
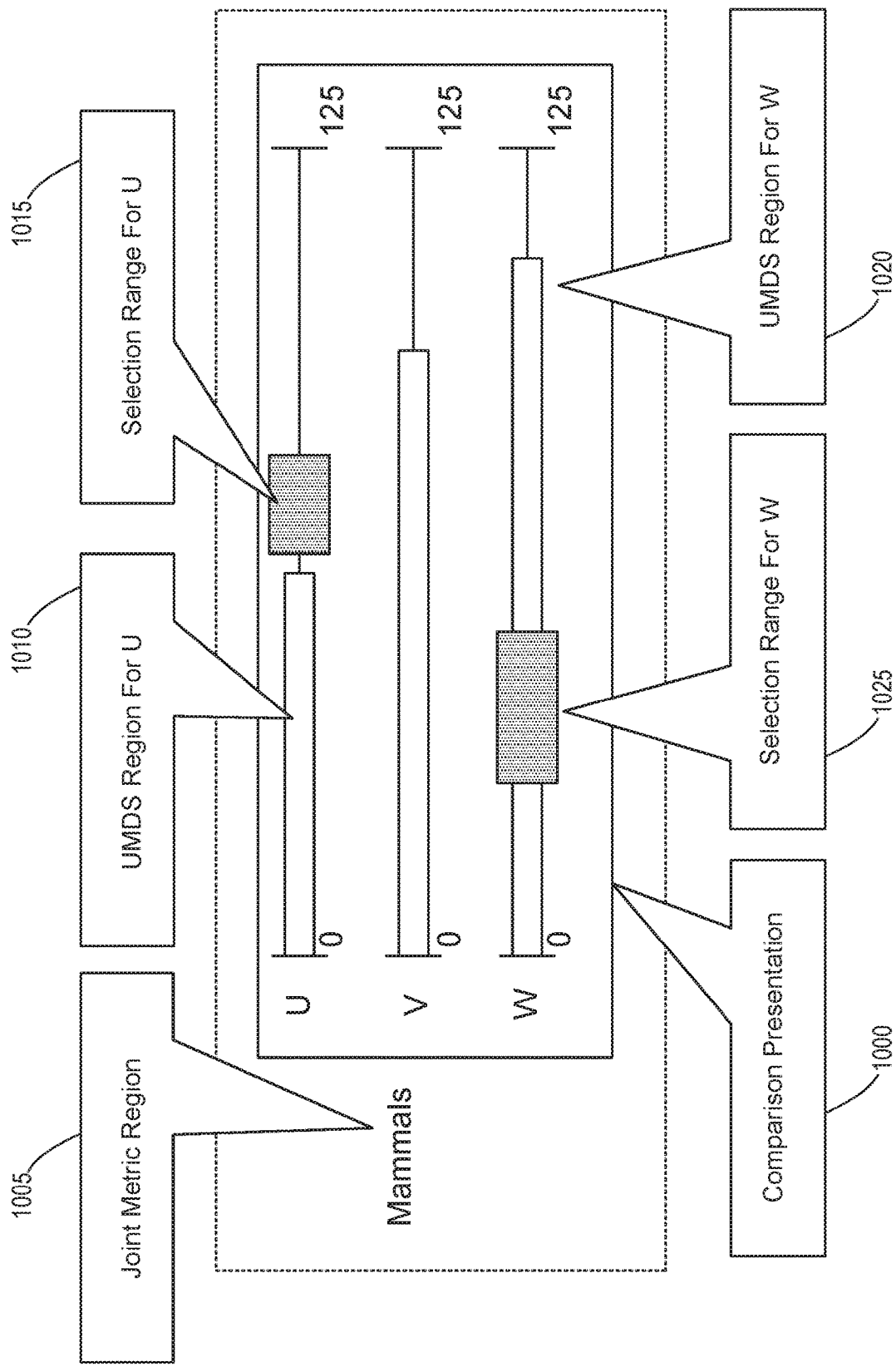
FIG. 10 illustrates an example of a comparison presentation of multiple underlying metric sources, according to one embodiment.

FIG. 10 illustrates an example of a comparison presentation 1000 of multiple underlying metric sources. A UMDS region for U 1010 shows a line graph based on data from an underlying metric source U. A selection rage for U 1015 is shown as well. Similarly, the comparison presentation 1000 includes a UMDS region for W 1020 based on data from an underlying metric data source W. A selection rage for W 1025 is shown as well. A user may provide an input within the joint metric region 1005 to interactively remove the selection ranges 1015 and 1025.

Figure 11A:
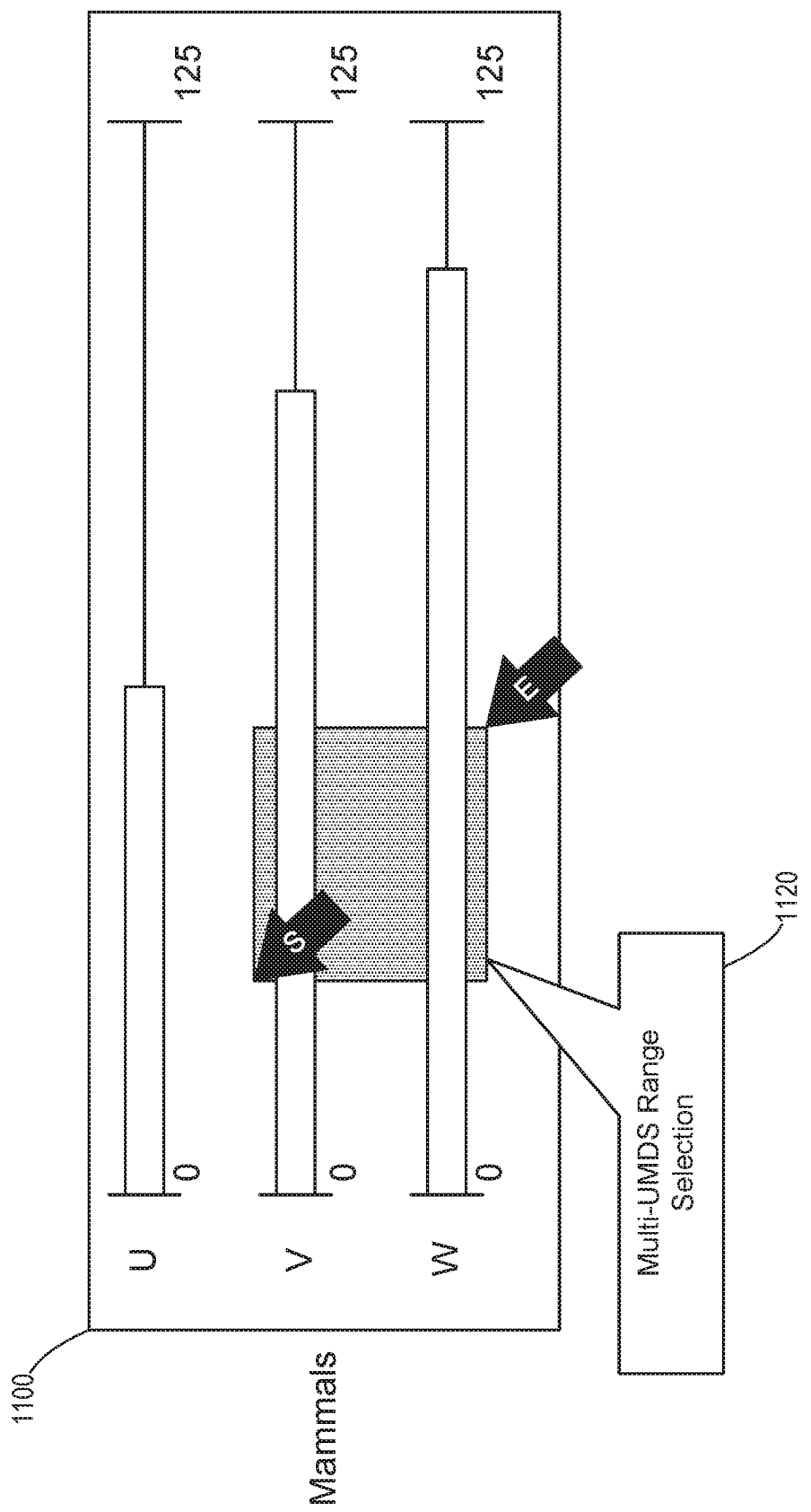
FIG. 11A illustrates a comparison presentation that includes regions of underlying metric data sources (UMDS regions) aligned with respect to one another for visual comparison, according to one embodiment.

FIG. 11A illustrates a comparison presentation 1100 that includes UMDS regions U, V, and W that are aligned with respect to one another for visual comparison. A locator device may provide one or more combinations of inputs to select an area on the display that encompasses a range of one or more of the underlying metric data sources.

As an example, the specific comparison presentation format shown in FIG. 11A enables a user to interactively select the same range of data for two or more of the underlying metric data sources. In the illustrated embodiment, a user may, for example, press a locator device at location S and at location E to draw a rectangle, potentially holding down an input in a dragging motion between location S and location E. Because the axes of the presented data are parallel and aligned, the horizontal range of the rectangle specifies the selected range 1120 and the vertical range of the rectangle specifies to which one or more of the underlying metric data sources the range filtering should be applied. As illustrated, the system will only apply the horizontal range selection 1120 to the underlying metric data sources V and W.

Figure 11B:
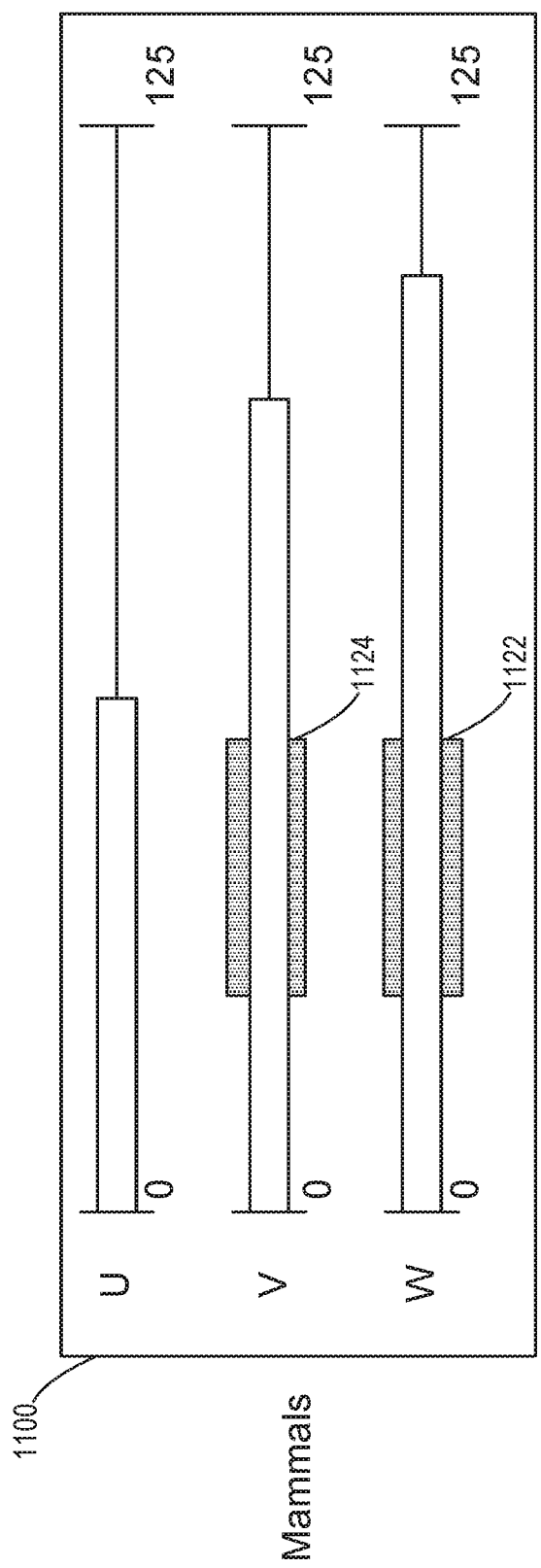
FIG. 11B illustrates the resulting selection of the identical ranges for the two different underlying metric data sources, according to one embodiment.

FIG. 11B illustrates the resulting selection of the identical ranges 1122 and 1124 for the underlying metric data sources V and W.

Many of the embodiments, examples, variations, and options described herein may be implemented and/or provided for via a computer program product including a computer-readable medium having stored thereon instructions that may be used to program a computer system or other electronic device to perform the functions, processes, steps, and algorithms described herein. Examples of computer-readable media include, but are not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. In some embodiments, a network may not be necessary or even helpful. A computer system, connected via a network or not, may include a workstation, laptop computer, disconnectable mobile computer, server, mainframe, cluster, so-called "network computer" or "thin client," tablet, smartphone, personal digital assistant or another hand-held computing device, "smart" consumer electronic device or appliance, medical device, or a combination thereof.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or another customized or programmable device. The memory may include static RAM, dynamic RAM, flash memory, one or more flip-flops, ROM, CD-ROM, disc, tape, magnetic, optical, or another computer storage medium.

Without limitation and to the extent not inconsistent with other, more specific, discussions of hardware, firmware, and software herein, it is appreciated that suitable software to assist in implementing the systems and methods described herein is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

As previously noted, several aspects of the embodiments described herein may be implemented as software modules or components. As used herein, a software module or component may include any type of computer instruction or computer-executable code located within a memory device. A software module may, for instance, include one or more physical or logical blocks of computer instructions, which may be organized as a routine, program, object, component, data structure, class, etc., that performs one or more tasks or implements particular abstract data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Additional description of various embodiments and implementations of the various subsystems are provided below. Each of the various embodiments of subsystems described herein may be implemented as stand-alone systems or used in combination with other features or characteristics of other embodiments of the same subsystem or of different subsystems.

Many of the examples used herein are provided in the context of a traditional teacher/student model. However, the systems and methods described herein can be broadly applied to other situations in which many participants or assessees are engaging in common tasks that can be evaluated and graded in some form. For example, an employer may utilize the systems and methods herein to view a population of employees or corporate divisions.

In many instances, the terms "instantaneously," "at the same time," "immediately," and "simultaneously" are used herein in the colloquial sense based on the visual perception of a user. Specifically, the term "instantaneously" is used herein as a term that modifies some task or action. Since no task in the physical world happens in zero time, in the context of human users interacting with computing devices, the term "instantaneously" can refer to a task or action that is completed within approximately 2 seconds.

The term "immediately" can be used to modify a task or action as well. In the context of human users interacting with computing devices, the term "immediately" can refer to a task or action that happens fast enough to not significantly delay a user in achieving a goal. For instance, "immediately" may be used to describe tasks or actions that that are completed in less than 10 seconds.

The term "simultaneously" is used herein to describe the interactive presentation of a plurality of data objects. Data objects may be described as being presented or displayed "simultaneously" when all of the data objects are presented for human perception for approximately the sampling speed of the human eye (e.g., approximately $1/30^{th}$ of a second). Data objects that are on the screen at the same time for less than $1/30^{th}$ of a second are unlikely to be perceived by a user.

This disclosure has been provided in the context of numerous examples and variations, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present disclosure should, therefore, be interpreted to encompass at least the following claims:

What is claimed is:

1. A system, comprising:
   a processor;
   a communications module to access a data store with:
      a first plurality of metrics for a set of activities for a first population of students,
      a second plurality of metrics for the set of activities for a second population of students, and
      a metric value assigned to each student for each activity; and
   a non-transitory computer-readable medium with instructions stored thereon that, when executed by the processor, cause the system to:
      generate quantized metric table (QMT) values for each of the first and second populations of students by quantizing the metric values of each respective activity into a set of quantized bins for each of the first and second population of students, wherein each quantized bin is associated with a metric value range and includes a count of the number of students whose metric values for the respective activity are within the metric value range;
      generate a comparison presentation table with comparison presentation category cells that, for each activity and metric value range, includes a QMT value for the first population of students and a QMT value for the second population of students;
      generate a first category-filtered metric table (FMT) formed from the QMT values based on a category selection made by a user, wherein the first FMT includes category-filtered activities along a first axis, and a category cell for each of a plurality of quantized bins of the first plurality of metrics associated with the displayed category-filtered activities along a second axis with a QMT value based on a combination of the associated activity, metric, and category;
   generating a first quantized metric presentation (QMP) formed from the first FMT,
      receive, via an electronic input, a user selection of a category cell in the QMP corresponding to an updated first FMT of a subset of the first population of students associated with the selected category cell; and
      display a modified first QMP with a filtered first QMP based on the updated first FMT of the subset of the first population of students.

2. The system of claim 1, wherein the instructions, when executed by the processor, further cause the system to:
   receive a user input selecting a QMT value within one of the comparison presentation category cells associated with a selected activity and a subset of the first population of students whose metrics for the selected activity are within the metric value range of the selected comparison presentation category cell; and
   generate a modified comparison presentation table with modified comparison presentation category cells for each of the learning activities for the selected subset of the first population of students and a corresponding subset of the second population of students whose metrics for the selected activity are within the metric value range of the selected comparison presentation category cell.

3. A method, comprising:
   retrieving, from a data store, a first plurality of metrics for a set of learning activities for a first population of students;
   generating a first quantization metric table (QMT) from the first plurality of metrics, the first population of students, the set of learning activities, and a set of quantization functions;
   retrieving, from the data store, a second plurality of metrics for the set of learning activities for a second population of students;

generating a second QMT from the second plurality of metrics, the second population of students, the set of learning activities, and the set of quantization functions;

displaying, via an electronic display, the first QMT as part of a graphical user interface (GUI);

displaying, via the electronic display, the second QMT as part of the GUI;

receiving, via an electronic input device, a request from a user to view a comparison presentation of the first and second QMTs;

identifying a difference between a metric of the first QMT and a metric of the second QMT for a common learning activity;

rendering the identified difference visually distinct in the GUI;

generating a first category-filtered metric table (FMT) formed from the first QMT based on a category selection made via the graphical user interface by a user, wherein the first FMT includes category-filtered learning activities along a first axis, and a category cell for each of a plurality of quantized bins of the first plurality of metrics associated with the displayed category-filtered learning activities along a second axis with a QMT value based on a combination of the associated learning activity, metric, and category;

generating a first quantized metric presentation (QMP) formed from the first FMT, receiving, via an electronic input, a user selection of a category cell in the first QMP corresponding to an updated first FMT of a subset of the first population of students associated with the selected category cell; and displaying a modified first QMP with a filtered first QMP based on the updated first FMT of the subset of the first population of students.

4. The method of claim 3, wherein rendering the identified difference visually distinct comprises highlighting the identified difference.

5. The method of claim 3, further comprising:
generating a second category-filtered metric table (FMT) formed from the second QMT based on a category selection made via the graphical user interface by a user; and displaying, via the electronic display, the second FMT as part of the GUI.

6. The method of claim 5, further comprising:
generating a second QMP formed from the second FMT, wherein the second FMT includes the category-filtered learning activities along a first axis, and a category cell for each of a plurality of quantized bins of the second plurality of metrics associated with the displayed category-filtered learning activities along a second axis with a QMT value based on a combination of the associated learning activity, metric, and category; and displaying, via the electronic display, the second QMP as part of the GUI.

7. The method of claim 6, further comprising:
displaying a modified second QMP with a filtered second QMP based on an updated second FMT of a subset of the second population of students based on the user selection of the category cell in the first QMP.

8. The method of claim 6, wherein the category cells of each of the first QMP and the modified first QMP is a count of the number of students in the first FMT within the respective category.

9. The method of claim 3, wherein each of the learning activities comprises one or more of: a test, a quiz, a homework assignment, an attendance record, a lab assignment, and an exam.

10. The method of claim 3, wherein the displayed category cell of each of the first QMP and the modified first QMP is a percentage of selected students in the first FMT within the respective category.

* * * * *